(12) United States Patent
Yoshizumi

(10) Patent No.: US 9,830,840 B2
(45) Date of Patent: Nov. 28, 2017

(54) DISPLAY DEVICE

(71) Applicant: Semiconductor Energy Laboratory Co., Ltd., Atsugi-shi, Kanagawa-ken (JP)

(72) Inventor: Kensuke Yoshizumi, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 69 days.

(21) Appl. No.: 14/807,109

(22) Filed: Jul. 23, 2015

(65) Prior Publication Data

US 2016/0037657 A1 Feb. 4, 2016

(30) Foreign Application Priority Data

Jul. 31, 2014 (JP) ................................ 2014-155999

(51) Int. Cl.
*G06F 1/16* (2006.01)
*G09F 9/30* (2006.01)
*G09F 9/35* (2006.01)

(52) U.S. Cl.
CPC ............ *G09F 9/301* (2013.01); *G06F 1/1652* (2013.01); *G09F 9/35* (2013.01)

(58) Field of Classification Search
CPC ........... G09F 9/301; G09F 9/35; G06F 1/1652
USPC ............ 361/679.01, 679.02, 679.08, 679.09, 361/679.26, 679.27, 679.31, 679.32, 361/679.33, 679.47, 679.52, 679.54, 361/679.55
See application file for complete search history.

(56) References Cited

U.S. PATENT DOCUMENTS

| | | | |
|---|---|---|---|
| 6,771,237 B1 * | 8/2004 | Kalt | G02B 26/02 345/31 |
| 7,559,163 B2 * | 7/2009 | Ofuji | G03B 21/58 160/265 |
| 7,623,290 B2 * | 11/2009 | Liang | G03B 21/56 359/443 |
| 8,367,440 B2 | 2/2013 | Takayama et al. | |
| 8,415,208 B2 | 4/2013 | Takayama et al. | |
| 9,013,367 B2 * | 4/2015 | Cope | G09F 9/30 345/1.3 |
| 9,098,241 B1 * | 8/2015 | Cho | H05K 1/028 |
| 2004/0183958 A1 * | 9/2004 | Akiyama | G09F 9/30 349/58 |
| 2009/0060249 A1 * | 3/2009 | Liou | H04R 7/06 381/386 |

(Continued)

FOREIGN PATENT DOCUMENTS

JP 2003-174153 A 6/2003

*Primary Examiner* — Steven T Sawyer
*Assistant Examiner* — Sagar Shrestha
(74) *Attorney, Agent, or Firm* — Fish & Richardson P.C.

(57) ABSTRACT

A display device that is suitable for increasing in size is provided. A display device that is suitable for space saving is provided. A foldable display device is provided. A structure in which a plurality of supporting members each having a belt-like shape are arranged at intervals on a rear surface of a flexible display panel fixed by a fixing portion is employed. One of the plurality of supporting members, which is positioned farthest from the fixing portion, is connected to a cord, and the cord is rolled up by a roll-up mechanism at an end portion of the cord toward the fixing portion.

9 Claims, 19 Drawing Sheets

(56) References Cited

U.S. PATENT DOCUMENTS

| | | | |
|---|---|---|---|
| 2010/0182218 A1* | 7/2010 | Daniel | G09F 9/33 |
| | | | 345/1.3 |
| 2010/0302772 A1* | 12/2010 | Lin | E06B 9/304 |
| | | | 362/231 |
| 2011/0043976 A1* | 2/2011 | Visser | G09F 9/00 |
| | | | 361/679.01 |
| 2012/0067531 A1* | 3/2012 | Ehrsam | A47H 1/18 |
| | | | 160/368.1 |
| 2012/0204453 A1* | 8/2012 | Jung | G09F 9/301 |
| | | | 40/517 |
| 2013/0214324 A1 | 8/2013 | Takayama et al. | |
| 2013/0271940 A1* | 10/2013 | Cope | H05K 7/14 |
| | | | 361/809 |
| 2014/0247544 A1* | 9/2014 | Ryu | G09F 11/18 |
| | | | 361/679.01 |
| 2015/0029229 A1* | 1/2015 | Voutsas | G06F 1/1652 |
| | | | 345/661 |

\* cited by examiner

FIG. 2A1
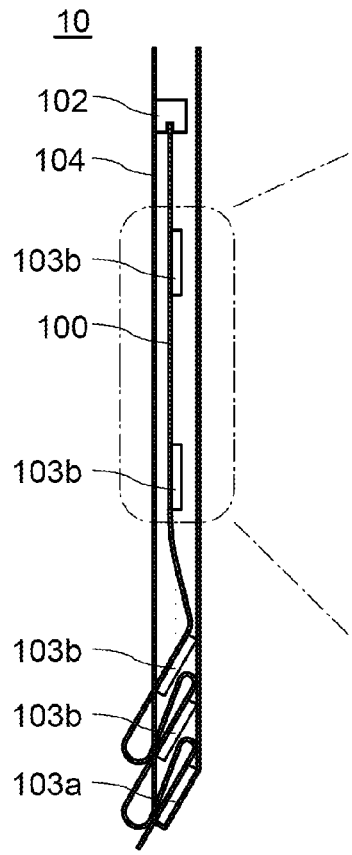
FIG. 2A2
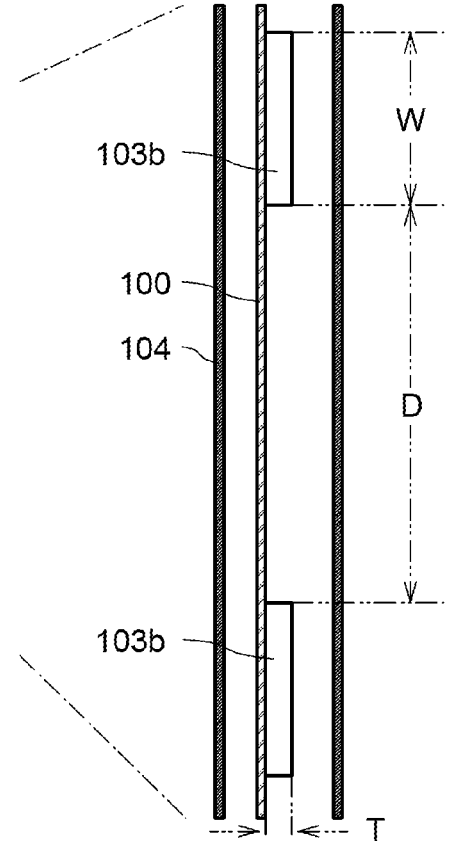
FIG. 2B1
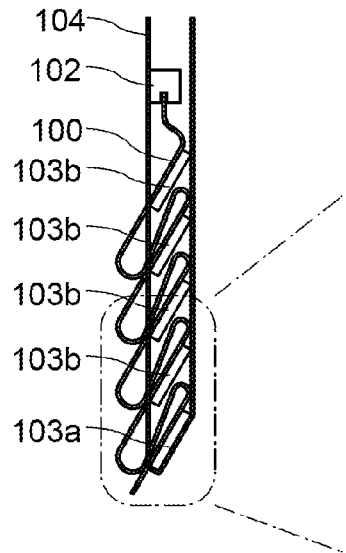
FIG. 2B2
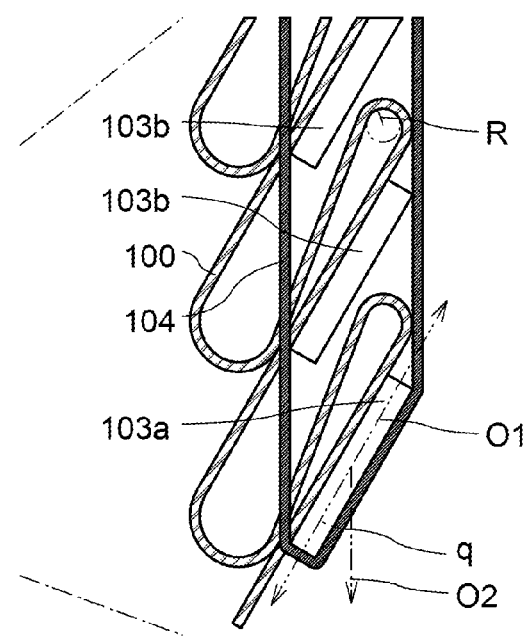

FIG. 3A1
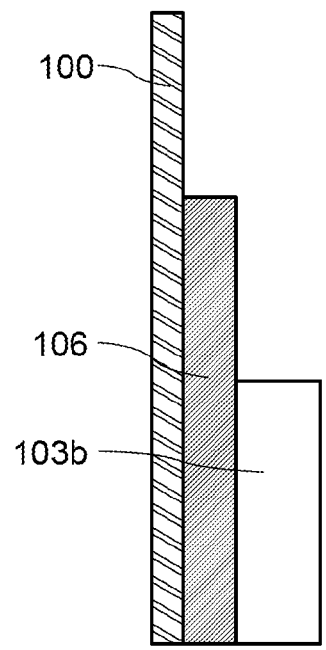
FIG. 3A2
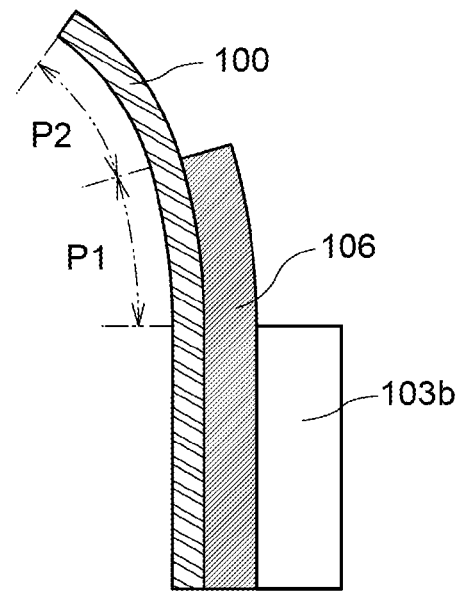
FIG. 3B1
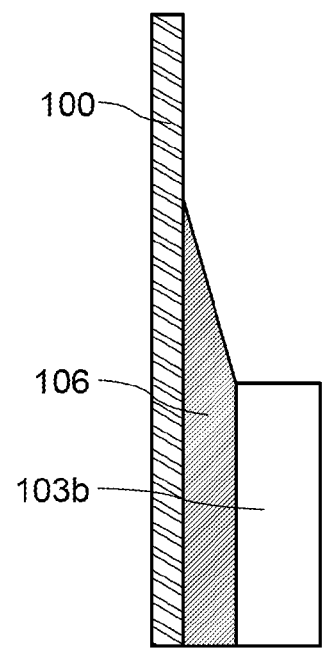
FIG. 3B2
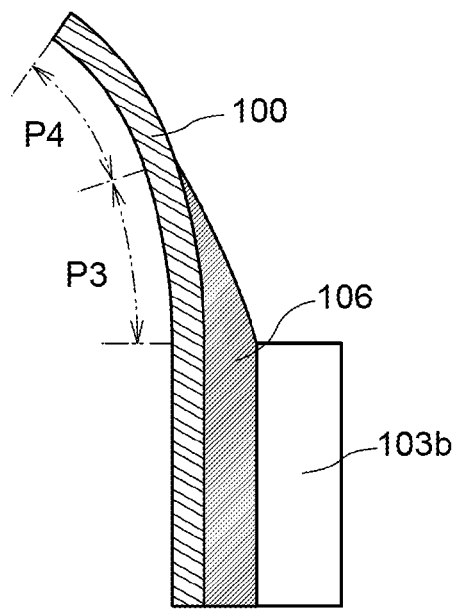

FIG. 7A
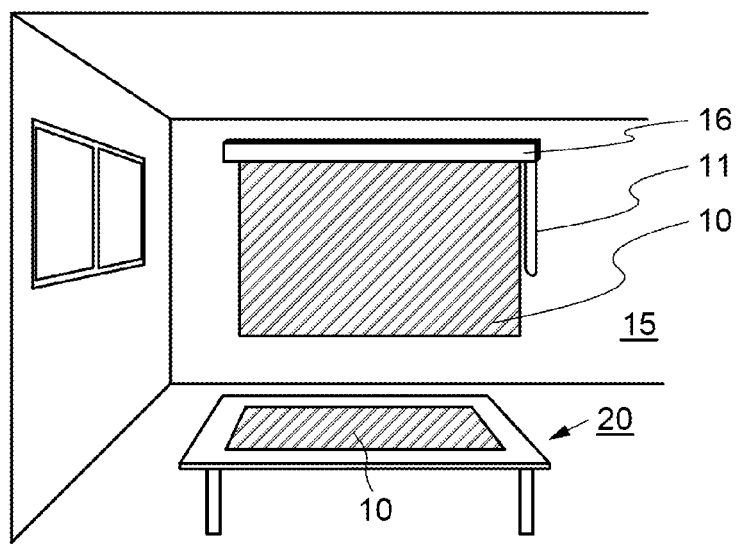
FIG. 7B
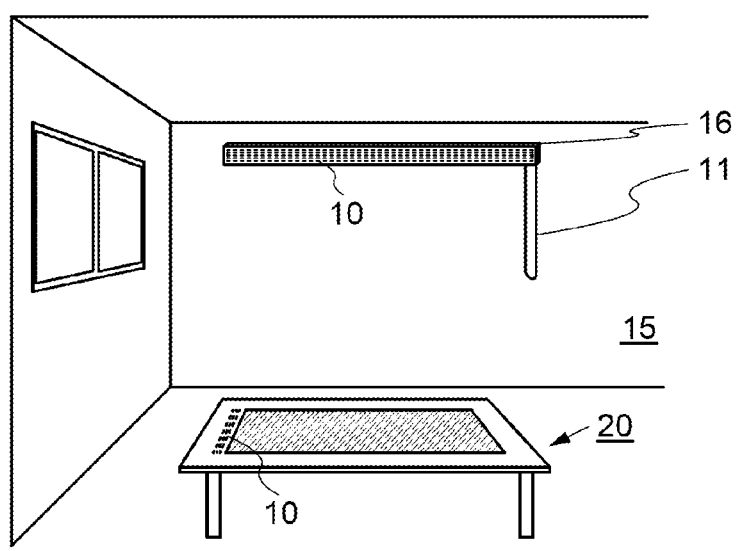
FIG. 7C
FIG. 7D
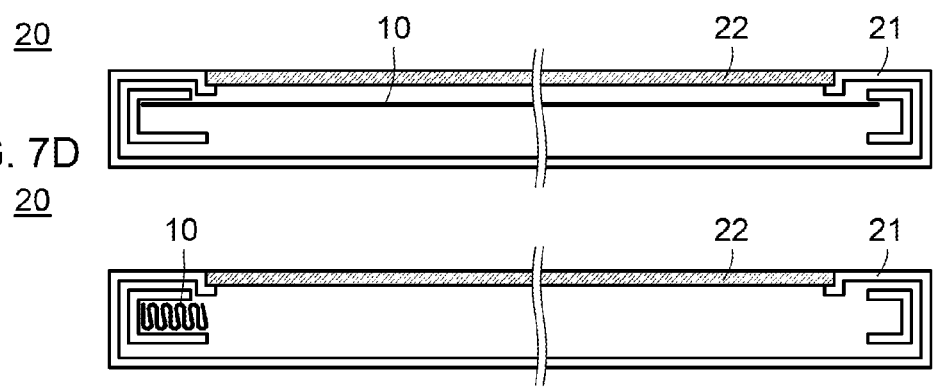

DISPLAY DEVICE

BACKGROUND OF THE INVENTION

1. Field of the Invention

One embodiment of the present invention relates to a display device.

Note that one embodiment of the present invention is not limited to the above technical field. The technical field of one embodiment of the invention disclosed in this specification and the like relates to an object, a method, or a manufacturing method. In addition, one embodiment of the present invention relates to a process, a machine, manufacture, or a composition of matter. Specifically, examples of the technical field of one embodiment of the present invention disclosed in this specification include a semiconductor device, a display device, a light-emitting device, a lighting device, a power storage device, a storage device, a method for driving any of them, and a method for manufacturing any of them.

2. Description of the Related Art

In recent years, larger display devices have been demanded. For example, television sets including display panels with a diagonal of greater than or equal to 40 inches have spread in ordinary households and have taken on an aspect of an increase in size.

Furthermore, display devices are expected to find widespread application and modes of the display devices become diversified.

Examples of the display device include, typically, a liquid crystal display device, a light-emitting device including a light-emitting element such as an organic electroluminescent (EL) element or a light-emitting diode (LED), and an electronic paper performing display by an electrophoretic method or the like.

For example, in a basic structure of an organic EL element, a layer containing a light-emitting organic compound is provided between a pair of electrodes. By voltage application to this element, the light-emitting organic compound can emit light. A display device including such an organic EL element needs no backlight which is necessary for liquid crystal display devices and the like; therefore, thin, lightweight, high contrast, and low power consumption display devices can be obtained.

Furthermore, Patent Document 1 discloses a flexible active matrix light-emitting device in which an organic EL element and a transistor serving as a switching element are provided over a film substrate.

REFERENCES

Patent Document

Patent Document 1: Japanese Published Patent Application No. 2003-174153

SUMMARY OF THE INVENTION

An object of one embodiment of the present invention is to provide a display device that is suitable for increasing in size. Another object is to provide a display device that is suitable for space saving. Another object is to provide a foldable display device. Another object is to provide a highly reliable display device.

Another object of one embodiment of the present invention is to provide a novel display device, a novel light-emitting device, a novel lighting device, a novel electronic device, or the like. Another object is to suggest an application of a novel display device.

Note that the descriptions of these objects do not disturb the existence of other objects. Note that one embodiment of the present invention does not necessarily achieve all the objects describe above. Objects other than the above objects will be apparent from and can be derived from the description of the specification and the like.

One embodiment of the present invention is a display device including a display panel, a fixing portion, a plurality of supporting members, a cord, and a roll-up mechanism. The display panel is flexible. The fixing portion has a function of supporting part of the display panel. The plurality of supporting members each have a belt-like shape and are arranged on a rear surface of the display panel at intervals. Each of the plurality of supporting members is placed in a direction substantially parallel to the fixing portion. The cord is connected to one of the plurality of supporting members that is the farthest from the fixing portion. The roll-up mechanism has a function of rolling up the cord. The display panel has a first state where a display surface is flat and a second state where the display surface is folded. Furthermore, the display device has a function of changing a distance between the fixing portion and the supporting member that is the farthest from the fixing portion with the roll-up mechanism so that the state of the display panel is changed to the first state, the second state, or the state between the first state and the second state.

In the above, the smallest curvature radius of a curved portion of the display panel in the second state is preferably greater than or equal to 1 mm and less than or equal to 50 mm.

In the above, a cushioning material is preferably provided between the supporting member and the display panel. It is preferable that the cushioning material have elasticity and the width of the cushioning material be larger than that of the supporting material in a short-side direction.

In the above, the thickness of the supporting member is preferably greater than or equal to 1 mm and less than or equal to 30 mm.

In the above, the distance between the two adjacent supporting members in the first state is preferably larger than each of the widths of the two adjacent supporting members in the short-side direction.

In the above, an angle formed by the short-side direction of the supporting member and a displacement direction of the supporting member in the second state is preferably greater than or equal to 10° and less than 90°.

In the above, it is preferable that an adjusting mechanism which adjusts the angle formed by the short-side direction of the supporting member and the displacement direction of the supporting member be included.

In the above, the fixing portion preferably includes a circuit electrically connected to the display panel. Furthermore, the fixing portion preferably includes at least one of an antenna, a wireless receiver, a wireless transmitter, a battery, an arithmetic device, and a memory device.

One embodiment of the present invention can provide a display device that is suitable for increasing in size. One embodiment of the present invention can provide a display device that is suitable for space saving. One embodiment of the present invention can provide a foldable display device. One embodiment of the present invention can provide a highly reliable display device.

Note that the description of these effects does not disturb the existence of other effects. One embodiment of the present invention does not necessarily achieve all the effects listed above. Other effects will be apparent from and can be derived from the description of the specification, the drawings, the claims, and the like.

BRIEF DESCRIPTION OF THE DRAWINGS

FIGS. 2A1, 2A2, 2B1, and 2B2 illustrate a display device of one embodiment;

FIGS. 3A1, 3A2, 3B1, and 3B2 illustrate display devices of one embodiment;

FIGS. 7A to 7D illustrate application examples of a display device of one embodiment;

DETAILED DESCRIPTION OF THE INVENTION

Figure 1A:
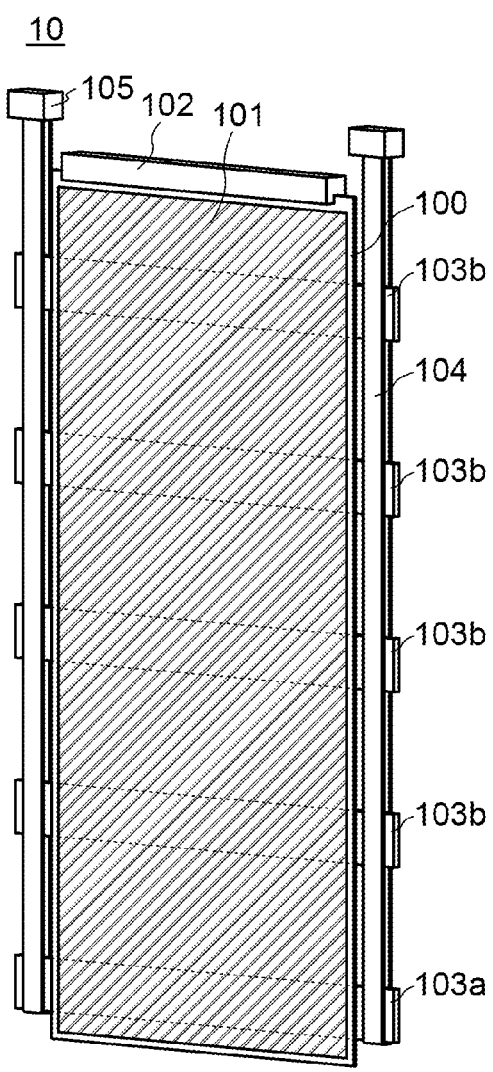
FIGS. 1A to 1C illustrate a display device of one embodiment.

Embodiments will be described in detail with reference to drawings. Note that the present invention is not limited to the description below, and it is easily understood by those skilled in the art that various changes and modifications can be made without departing from the spirit and scope of the present invention. Accordingly, the present invention should not be interpreted as being limited to the content of the embodiments below.

Note that in the structures of the invention described below, the same portions or portions having similar functions are denoted by the same reference numerals in different drawings, and description of such portions is not repeated. Further, the same hatching pattern is applied to portions having similar functions, and the portions are not especially denoted by reference numerals in some cases.

Note that in each drawing described in this specification, the size, the layer thickness, or the region of each component is exaggerated for clarity in some cases. Therefore, embodiments of the present invention are not limited to such a scale.

Note that in this specification and the like, ordinal numbers such as "first", "second", and the like are used in order to avoid confusion among components and do not limit the number.

Note that the terms "film" and "layer" can be interchanged with each other depending on the case or circumstances. For example, the term "conductive layer" can be changed into the term "conductive film" in some cases. Also, the term "insulating film" can be changed into the term "insulating layer" in some cases.

Embodiment 1

In this embodiment, structure examples of a display device of one embodiment of the present invention are described with reference to drawings.

In the display device of one embodiment of the present invention, a plurality of supporting members each having a belt-like shape are arranged on a rear surface of a flexible display panel at intervals. An upper portion of the display panel is fixed by a fixing portion. One of the plurality of supporting members which is positioned farthest from the fixing portion is connected to a cord. One end of the cord is connected to a roll-up mechanism. The roll-up mechanism can roll up and unroll the cord.

The display device can be set such that the display panel is suspended, for example. For example, the display device can be in a state where the display surface of the display panel is substantially flat (a first state). When the display surface is in the first state, by rolling up the cord, the supporting member which is positioned farthest from the fixing portion can be moved to the fixing portion side. Thus, the display panel positioned between the plurality of supporting members is curved, so that the state of the display panel can be changed into a state where the display panel is folded (a second state). Furthermore, the state of the display panel can be changed from the second state to the first state by unrolling the cord. That is, the state of the display panel can be changed between the first state and the second state.

The cord preferably serves as a guide for making the plurality of supporting members move in only one direction. This enables the plurality of supporting members to be stacked substantially parallel to one another when the display panel is folded. In addition, the cord preferably has a function of adjusting an angle of the supporting member.

With such a structure, the display panel positioned between the two adjacent supporting members is curved with an optimal curvature radius automatically (naturally) in accordance with the relative positions of the two supporting members. Accordingly, too much external force is not applied on the display panel, which can prevent the display panel from being broken by bend, for example.

With the above structure, just by moving the supporting member that is positioned farthest from the fixing portion in one direction with the cord, the display panel can be folded while keeping the optimal curvature radius. In addition, it is preferable that the angle of the supporting member be adjusted as described above because the curved shape of the display panel can be controlled more precisely.

It is preferable that a cushioning material having elasticity be provided between the supporting member and the display panel. The width of the cushioning material is made larger than that of the belt-like supporting member, which can prevent a bend of the display panel at a boundary portion between a region of the display panel which is provided with the supporting member and a region of the display panel which is not provided with the supporting member. It is particularly preferable that the shape or material of the cushioning material be such that a portion thereof farther from the supporting member has a lower restoring force. For example, the shape of the cushioning material is such that a portion thereof farther from the supporting member has a smaller thickness. In this manner, a problem such as a bend of the display panel in the vicinity of an end portion of the supporting member can be suppressed more effectively.

Furthermore, the curvature radius when the display panel is curved can be made larger as the supporting member is thicker, which can prevent breakage.

The plurality of supporting members are preferably arranged at regular intervals. It is particularly preferable that a distance between the two adjacent supporting members be set larger than the width of each of the supporting members. As the distance between the supporting members is larger, the area of the display panel which can be curved is increased, so that stress applied on the display panel can be dispersed, and the curvature radius when the display panel is curved can be made large.

A circuit for supplying a power source potential or a signal to the display panel may be incorporated in the fixing portion for fixing the display panel, for example. With the fixing portion up, a suspended display device using gravity can be obtained; however, one embodiment of the present invention is not limited thereto, and a variety of modes can be employed by changing the position of the fixing portion. For example, the fixing portion can be provided such that the display panel is folded in a lateral direction (in a horizontal direction). Here, in order to unfold the display panel, a mechanism which pulls the display panel in the lateral direction may be included.

The display surface of the display device of one embodiment of the present invention is made flat when the display device is used. The display surface is folded when the display device is not in use, whereby the display panel can be stored. Accordingly, unlike in a conventional stationary television set or the like, an installation site does not need to be secured. A lightweight flexible panel is used for the display panel, and thus the display panel can be easily carried in the folded state. In the case of a projection display device (also referred to as a projector), for example, a screen is also needed, and the screen and a main body need to be apart from each other to some extent in order to display a large image. In contrast, the display device of one embodiment of the present invention can display an image on itself, so that a large image can be displayed even in a small room. In addition, the display device is compact in the state where the display surface is folded, and thus can be concealed easily with a drape, for example, and a room can look as if there is no display device therein, leading to neater interior.

In the display device of one embodiment of the present invention, the display panel can be folded and stored without changing the position or the direction of the fixing portion. Here, in the case of compact storage by rolling up the display panel itself, a rolling-up axis corresponds to the fixing portion of the display device of one embodiment of the present invention. Accordingly, a mechanism for rotating the fixing portion needs to be additionally included. In the case of a structure in which a circuit or the like for driving the display panel is provided in the fixing portion, and a connector which electrically connects the fixing portion to the outside, a connector which electrically connects the fixing portion to the display panel, or the like is provided, a mechanism for maintaining the electrical connection by the connector even when the fixing portion is rotated is needed, which leads to a complicated structure and might cause a breakdown. In contrast, in one embodiment of the present invention, such a rotating mechanism is not needed, and compact storage of the display panel is possible with an extremely simple structure.

In one embodiment of the present invention, more specifically, the following structure can be employed, for example.

Structure Example

Figure 1B:
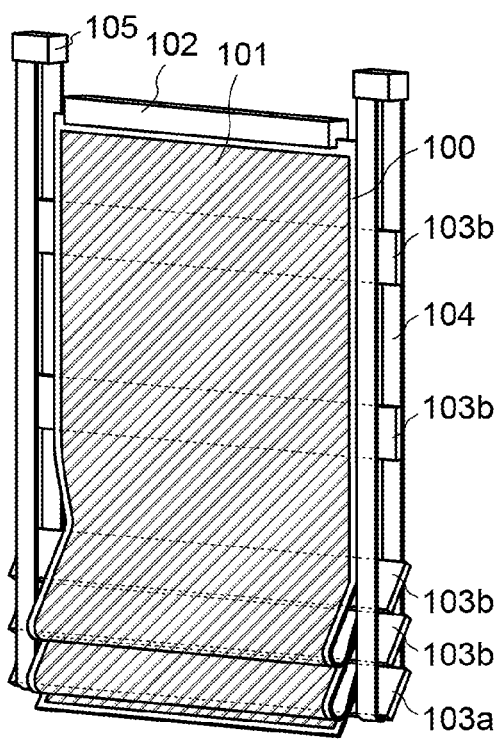
Figure 1C:
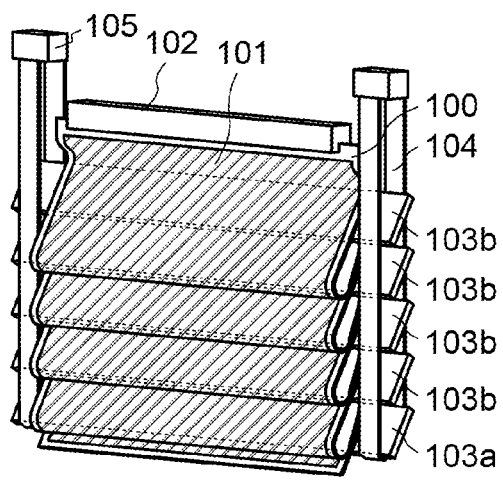

FIGS. 1A to 1C are schematic perspective views illustrating a display device 10 of one embodiment of the present invention. FIG. 1A illustrates a state where a display surface is flat, FIG. 1C illustrates a state where the display surface is folded, and FIG. 1B illustrates a state that is intermediate between the state of FIG. 1A and the state of FIG. 1C.

The display device 10 includes a display panel 100, a fixing portion 102, supporting members 103a and 103b, a cord 104, a roll-up mechanism 105, and the like. The display panel 100 includes a display portion 101.

Note that although the display device 10 is used with the display panel 100 suspended as the example here, one embodiment of the present invention is not limited to this positional relationship, and the display device 10 can also be used with the display panel 100 placed horizontally. Here, the vertical direction of the display portion 101 of the display panel 100 (a direction perpendicular to the long side of the fixing portion 102) is a long-side direction; however, one embodiment of the present invention is not limited thereto. For example, the display portion 101 may have a structure in which the horizontal direction of the display portion 101 (a direction parallel to the long side of the fixing portion 102) is the long-side direction or may have a square shape.

The display panel 100 is flexible. Accordingly, the state of the display panel 100 can be changed reversibly from the state where the display surface is flat to a state where the display surface is curved. For example, the display panel 100 can be folded so that the display surface is placed inward (referred to as inwardly bent) and so that the display surface is placed outward (referred to as outwardly bent). Accordingly, the display panel 100 can be folded. A part of the display panel 100 which is supported by the supporting members 103a and 103b does not need to be flexible.

The fixing portion 102 has a function of fixing an upper portion of the display panel 100 and suspending the display panel 100. For example, the fixing portion 102 may be set on a wall in a room, or may be fixed to a frame or the like so that the display device 10 can be carried.

It is preferable that the fixing portion 102 and the display panel 100 be fixed so that the relative position of the fixing portion 102 and the display panel 100 is not changed. For example, the fixing portion 102 and the display panel 100 may be fixed with a screw, a rivet, or the like, or may be attached to each other with an adhesive or the like. The fixing portion 102 may sandwich the display panel 100.

In the fixing portion 102, a flexible printed circuit (FPC) or the like electrically connected to the display panel 100 is provided. Here, a connector or a wiring which is electrically connected to the FPC is preferably provided in the fixing portion 102. Furthermore, a circuit for supplying a signal or a voltage to the display panel 100 is preferably provided in the fixing portion 102. Besides, one or more of an antenna, a wireless receiver, a wireless transmitter, a power supply line, a battery, a printed board mounted with an IC such as an arithmetic device or a memory device, an external connection port, and the like may be provided in the fixing portion 102.

The supporting members 103a and 103b are provided on a side opposite to a surface of the display portion 101 side of the display panel 100 and have a function of supporting the display panel 100. The supporting members 103a and 103b each have a belt-like shape. The supporting members 103a and 103b are arranged in a short-side direction at intervals. Here, the supporting member which is positioned farthest from the fixing portion 102 when the display surface is flat is referred to as the supporting member 103a, and the supporting member other than the supporting member 103a is referred to as the supporting member 103b. A longer side of a surface of each of the supporting members 103a and 103b which overlaps with the display panel 100 is referred to as a long side, and a shorter side of a surface of each of the supporting members 103a and 103b which overlaps with the display panel 100 is referred to as a short side. The direction perpendicular to the surface of each of the supporting members 103a and 103b which overlaps with the display panel 100 is referred to as a thickness direction.

The supporting members 103a and 103b are preferably attached to the display panel 100 with an adhesive or the like, for example. Alternatively, they may be fixed with an adhesive member. It is preferable that an area where the supporting members 103a and 103b are fixed to the display panel 100 be large because a defect such as peeling of them can be suppressed.

For the supporting members 103a and 103b, a material having lower flexibility or higher rigidity than at least the display panel 100 can be used. When a material having a lower weight density than the display panel 100 is used for the supporting members 103a and 103b, breakage of the display panel 100 due to the weight of the supporting members 103a and 103b can be prevented. There is no particular limitation on the material used for the supporting members 103a and 103b, and any of a variety of materials such as a metal, an alloy, wood, paper, a synthetic resin, glass, rubber, and ceramic can be used. It is particularly preferable that plastic, an alloy containing titanium, or the like be used because of its lightness. A reduction in weight of the supporting members 103a and 103b may be achieved, for example, by being provided with an opening or the supporting members 103a and 103b each having a cavity inside. At least part of each of the supporting members 103a and 103b may have a flat surface which supports the display panel 100, and the other part may have unevenness.

The cord 104 is connected to at least the supporting member 103a. The display device 10 includes the two or more cords 104, and the cords are connected to both end portions of the supporting member 103a, whereby the supporting member 103a can be supported with its long-side direction not inclined and being in a direction substantially perpendicular with respect to a vertical direction.

For example, the supporting member 103a and the cord 104 may be fixed with an adhesive or by the cord 104 being bound to the supporting member 103a. Alternatively, the supporting member 103a and the cord 104 may be fixed in such a manner that a through hole is provided in the supporting member 103a, the cord 104 is drawn through the through hole, and then a member having a larger diameter than the through hole is connected to the cord 104 so that the cord 104 does not come out of the through hole.

An upper portion of the cord 104 is provided with the rolling-up mechanism 105. The cords 104 are rolled up by the roll-up mechanism 105, whereby the supporting member 103a can be moved upward (to the fixing portion 102 side). The cords 104 are unrolled with the roll-up mechanism 105, whereby the supporting member 103a can be moved downward (to a side opposite to the fixing portion 102) with gravity.

The roll-up mechanism 105 may have any of a variety of structures as long as it has a function of rolling up the cords 104. For example, the roll-up mechanism 105 may include at least a rotation axis fixed to the cord 104. The roll-up mechanism 105 may have a structure in which the cords 104 are rolled up by pulling a roll-up cord described later or the like or a structure in which the cords 104 are electrically rolled up by a motor included in the roll-up mechanism 105. In this case, a structure in which a wireless receiver or the like is provided and operation can be performed with a remote controller may be employed.

Although the roll-up mechanism 105 and the fixing portion 102 are separately illustrated here, they may be included in one housing.

The cords 104 are rolled up by the roll-up mechanism 105, whereby the state of the display device 10 can be changed from the state of FIG. 1A to the state of FIG. 1C through the state of FIG. 1B. On the contrary, the cords 104 are unrolled by the roll-up mechanism 105, whereby the state of the display device 10 can be changed from the state of FIG. 1C to the state of FIG. 1A through the state of FIG. 1B. That is, by the roll-up mechanism 105, the state of the display panel 100 can be changed between the state of FIG. 1A and the state of FIG. 1C.

When the cords 104 are rolled up by the roll-up mechanism 105, the supporting member 103a is moved upward. At this time, as the distance between the supporting member 103a and the supporting member 103b adjacent to the supporting member 103a is smaller, the display panel 100 is more curved. At this time, external force applied on the display panel 100 is mainly force due to approach of the supporting member 103a and the supporting member 103b, gravity, or the like, and external force other than the above is not applied on the display panel 100, so that the display panel 100 is curved to have a natural shape in accordance with the relative positions of the two supporting members. Accordingly, breakage of the display panel 100 due to curvature (or bend) beyond the allowable curvature radius of the display panel 100 which is caused by too much external force applied on the display panel 100 can be prevented.

As illustrated in FIG. 1B, in accordance with move of the supporting member 103a, the supporting members 103b overlap with the supporting member 103a naturally. At this time, the distance between the adjacent supporting members is kept constant by force with which the display panel 100 returns to its original shape (also referred to as restoring force) when curved. Accordingly, the supporting members can be prevented from being too close to each other, leading to prevention of breakage of the display panel 100. Note that in the case where the restoring force of the display panel 100 is small with respect to the weight of the supporting member 103b, a mechanism which keeps a certain distance between the supporting members 103b or between the supporting member 103a and the supporting member 103b is preferably provided between the cord 104 and the supporting member 103b.

For example, when the supporting member 103a is pulled up in the state of FIG. 1A, part of the display panel 100 between the supporting member 103a and the supporting member 103b positioned the lowest is curved. Furthermore, as the distance to which the supporting member 103a is pulled up becomes larger, the curvature of the display panel 100 becomes larger. In accordance with this, the restoring force of the display panel 100 is increased. Here, the supporting members 103b are not fixed to the cord 104 and can be moved vertically, so that the supporting member 103b positioned the lowest is lifted by the restoring force of the display panel 100. After that, in a manner similar to the above, part of the display panel 100 between the supporting member 103b positioned the lowest and the adjacent supporting member 103b is curved. Thus, the supporting member 103a is pulled up by the cords 104, whereby the state of the display panel 100 can be changed from the state of FIG. 1A to the state of FIG. 1C through the state of FIG. 1B. Here, in a state where the display panel 100 is suspended, a curved portion of the display panel 100 which is closer to a lower side has a smaller curvature radius.

As illustrated in FIGS. 1A to 1C, it is preferable to employ a structure in which the cord 104 is folded back at the supporting member 103a and each of the supporting members 103b is sandwiched between two portions of the cord 104. Thus, the cord 104 can serve as a guide for making the supporting members 103 move only vertically.

Furthermore, when the cord 104 has a belt-like shape as illustrated in FIGS. 1A to 1C, the supporting members 103a and 103b can be held more stably. The width of the cord 104 can be, for example, greater than or equal to 2 mm and less than or equal to 100 mm, preferably greater than or equal to 5 mm and less than or equal to 50 mm, further preferably greater than or equal to 10 mm and less than or equal to 50 mm. Alternatively, the width of the cord 104 is preferably larger than the thickness of the supporting member 103a or 103b. Specifically, when the width of the cord 104 is greater than or equal to 5 mm, a problem such as unintended rotation of the supporting member 103a or 103b can be prevented.

Note that a mode of the cord 104 is not limited thereto. For example, the cord 104 may be a string-like material and passed through a through hole provided in the supporting member 103b. Also in this case, the cord 104 can serve as a guide for the supporting member 103b. In this case, a structure may be employed in which one of end portions of the string-like cord 104 is connected to the supporting member 103a and the other is connected to the roll-up mechanism 105, in which case the cord 104 is not necessarily folded back.

The roll-up mechanism 105 can adjust an angle of the supporting member 103a by rolling up only one of two end portions of the folded back cord 104. For example, the adjustment can be performed such that the short-side direction of the supporting member 103a is the vertical direction when the display surface of the display panel 100 is flat as illustrated in FIG. 1A, and such that an angle formed by the short-side direction of the supporting member 103a and the vertical direction is greater than 0° and less than or equal to 90° when the display surface of the display panel 100 is folded as illustrated in FIGS. 1B and 1C. The angle formed by the short-side direction of the supporting member 103a and the vertical direction is set to an angle close to 90°, whereby the display panel 100 can be more compact when folded.

For the cord 104, a material having higher flexibility than the display panel 100 can be used, for example. It is preferable that a fibrous material or the like be used for the cord 104 because the cord 104 can be rolled up easily. Although there is no particular limitation on a material which can be used for the cord 104, any of a variety of materials such as a natural fiber, a synthetic fiber, paper, a synthetic resin, rubber, a fibrous metal, and a fibrous alloy can be used. Furthermore, although the cord 104 has a belt-like shape in FIGS. 1A to 1C and the like, any of a variety of shapes such as a string-like shape, a thread-like shape, and a chain-like shape can be employed as long as the cord 104 can be rolled up by the roll-up mechanism 105.

FIG. 2A1 is a schematic view when seen from a side surface side of the display device 10 in the state of FIG. 1B, and FIG. 2A2 is an enlarged view of a region surrounded by a dashed dotted line in FIG. 2A1. FIG. 2B1 is a schematic view when seen from the side surface side of the display device 10 in the state of FIG. 1C, and FIG. 2B2 is an enlarged view of a region surrounded by a dashed dotted line in FIG. 2B1.

As illustrated in FIG. 2A2, in a flat region of the display panel 100, the two supporting members 103b are arranged with a distance D therebetween. The distance between the two supporting members 103b and the distance between the supporting members 103a and 103b are preferably the same. Alternatively, the distance may be larger as the supporting members are closer to an upper side (the fixing portion 102 side), or the distance may be larger as the supporting members are closer to the lower side.

The distance D between the two supporting members 103b is preferably larger than the width W of the supporting member 103b in the short-side direction. For example, the ratio D/W of the distance D to the width W can be greater than 1 and less than or equal to 30, preferably greater than or equal to 1.5 and less than or equal to 20, further preferably greater than or equal to 2 and less than or equal to 15. As the distance D is larger, the degree of freedom of a curved shape of the display panel 100 when the display panel 100 is folded is increased, and thus breakage of the display panel 100 can be prevented. On the other hand, as the distance D becomes smaller, the display panel 100 can be more compact when folded. Note that the same applies to the distance between the supporting member 103a and the supporting member 103b. In the case where the distance D between the two supporting members 103b or the distance between the supporting member 103a and the supporting member 103b is small, it is preferable that the number of the supporting members 103b be increased and the supporting members 103b be densely arranged.

The thickness T of the supporting member 103b is preferably greater than or equal to 1 mm and less than or equal to 30 mm, further preferably greater than or equal to 2 mm and less than or equal to 20 mm, still further preferably greater than or equal to 3 mm and less than or equal to 15 mm. As the thickness of the supporting member 103b becomes larger, the curvature radius when the display panel is curved can be made large, which can prevent breakage of the display panel. Note that the supporting member 103a may have a thickness different from that of the supporting member 103b and be formed with the same material as the supporting member 103b. The supporting member 103a positioned the lowest may be decorated.

As illustrated in FIG. 2B2, in the folded display device 10, inwardly curved portions of the display surface and outwardly curved portions thereof are alternately placed. Here, in a state where the display panel 100 is folded, the curvature radius R of a portion curved with the largest curvature among the curved portions of the display panel is preferably greater than or equal to 1 mm and less than or equal to 50 mm, further preferably greater than or equal to 2 mm and less than or equal to 30 mm, still further preferably greater than or equal to 4 mm and less than or equal to 20 mm.

In the state where the display panel 100 is folded, the angle of the supporting member 103a is preferably adjusted to a predetermined angle. As illustrated in FIG. 2B2, an angle formed by a short-side direction O1 of the belt-like supporting member 103a and a vertical direction O2 is denoted by θ, for example. In this case, the angle θ can be greater than 0° and less than or equal to 90°, preferably greater than or equal to 10° and less than 90°, further preferably greater than or equal to 30° and less than 90°. As the angle θ is larger, the display panel 100 can be folded in a compact way. Note that the vertical direction O2 described here is parallel to a direction (a displacement direction) in which the supporting member 103a is moved by the cords 104.

A cushioning material having elasticity is preferably provided between the display panel 100 and the supporting member 103a or 103b. FIG. 3A1 is an enlarged view of the vicinity of the end portion of the supporting member 103b in the case where a cushioning material 106 is provided. Note that the following description also applies to the supporting member 103a.

It is preferable that the cushioning material 106 be formed with a material having lower flexibility than at least the display panel 100 and having higher flexibility than the supporting member 103a or 103b. Furthermore, for the cushioning material 106, a material whose restoring force (force of returning a changed shape to the original shape) is larger than that of the display panel 100 can be favorably used. Favorable examples of the cushioning material 106 are an elastic body such as rubber and a metal plate serving as a leaf spring. By optimization of the thickness of any of these materials, a desired restoring force can be obtained.

When the cushioning material 106 is used, as illustrated in FIG. 3A2, the display panel 100 is curved with a smaller curvature in a portion P1 of the display panel 100 which overlaps with the cushioning material 106 than in a portion P2 of the display panel 100 which does not overlap with the cushioning material 106. Accordingly, a problem such as bend of the display panel 100 at the end portion of the supporting member 103b can be prevented effectively.

In addition, it is preferable that the cushioning material 106 have a shape or be formed with a material such that a portion of the cushioning material 106 farther from the supporting member 103b has a smaller restoring force. For example, as illustrated in FIG. 3B1, a portion of the cushioning material 106 farther from the supporting member 103b can be thinner. In this case, as illustrated in FIG. 3B2, a portion P3 of the display panel 100 which overlaps with the cushioning material 106 has a curved shape in which the curvature is continuously increased (the curvature radius is reduced) from a portion closer to the supporting member 103b to a portion farther from the supporting member 103b. A portion P4 of the display panel 100 which does not overlap with the cushioning material 106 is curved with a larger curvature than the portion P3. At this time, it is preferable that the angle of the end portion of the cushioning material 106 be sharper (that is, the angle be smaller) because the curvature between the portions P3 and P4 becomes continuous.

Figure 4A:
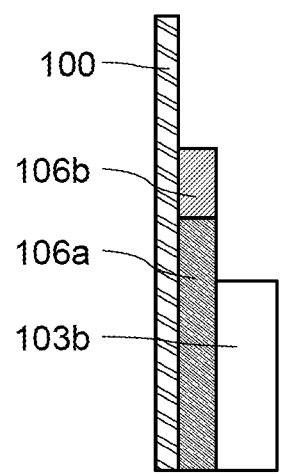
FIGS. 4A and 4B each illustrate a display device of one embodiment.
Figure 4B:
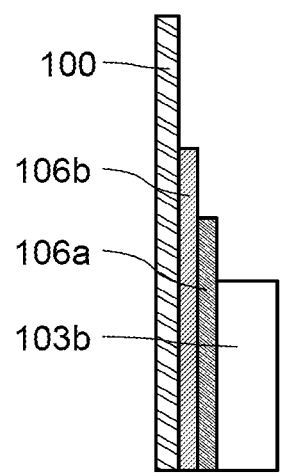

As illustrated in FIG. 4A, a cushioning material 106a may be provided at a portion close to the supporting member 103b, and a cushioning material 106b having a smaller restoring force than the cushioning material 106a may be provided at a portion far from the supporting member 103b. As illustrated in FIG. 4B, the cushioning material 106a and the cushioning material 106b may be stacked, and the width of the cushioning material 106b may be larger than that of the cushioning material 106a. Note that although two cushioning materials having a different restoring force are used here, three or more cushioning materials having a different restoring force may be used, and two or more cushioning materials having the same restoring force may be stacked.

The above is the description of a structure example.

Modification Example

Figure 5A:
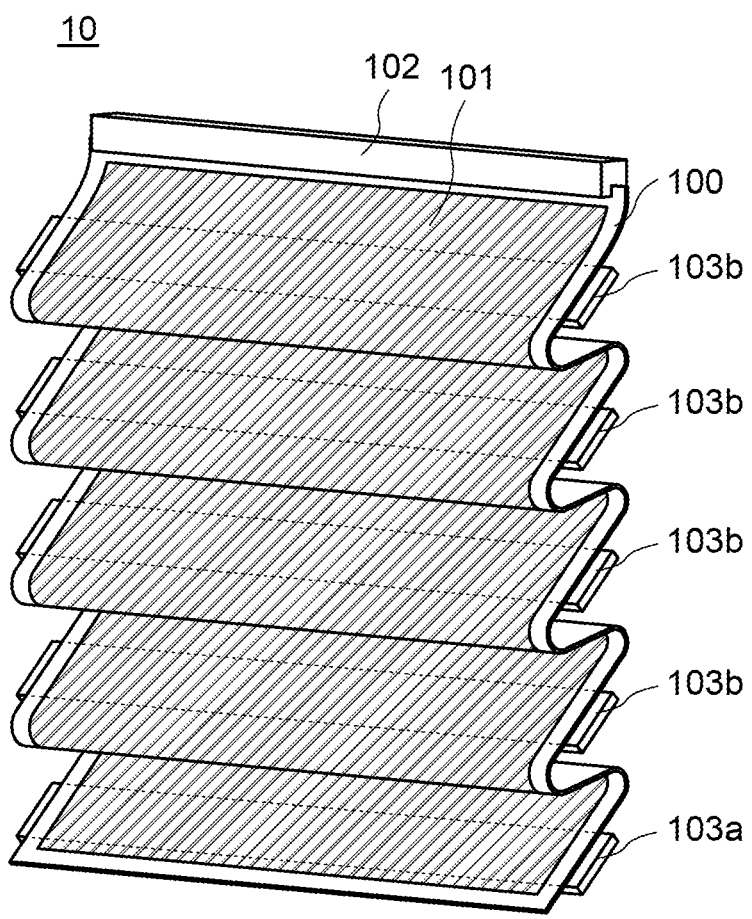
FIGS. 5A and 5B illustrate a display device of one embodiment.
Figure 5B:
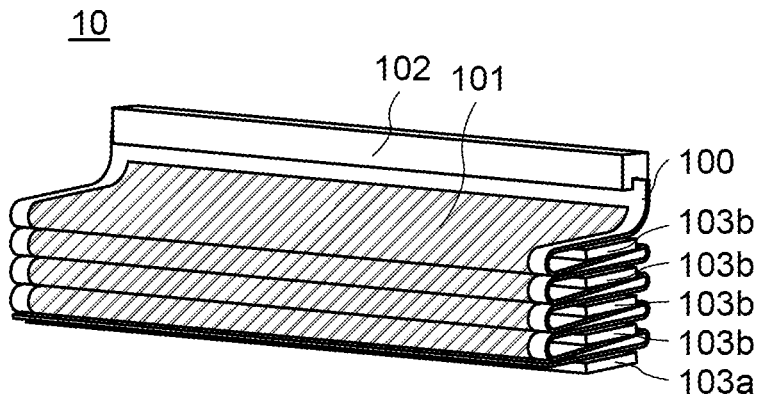

Although the display panel 100 is folded by pulling up the supporting member 103a which is the farthest from the fixing portion 102 with use of the cords 104 in the above structure example, the supporting members 103a and 103b may be pulled up at the same time. An example of such a case is illustrated in FIGS. 5A and 5B. FIG. 5A is a schematic perspective view of the display panel 100 in the middle of being folded, and FIG. 5B is a schematic perspective view illustrating the folded display panel 100.

Note that although the cord 104 and the like are not illustrated in FIGS. 5A and 5B for clarification, for connection relation between the cords 104 and the supporting members 103a and 103b, connection relation between the cords 104 and the supporting member 103a in the above structure example can be referred to. That is, a plurality of cords to which the supporting member 103a and each of the plurality of supporting members 103b are connected may be provided.

Figure 6A:
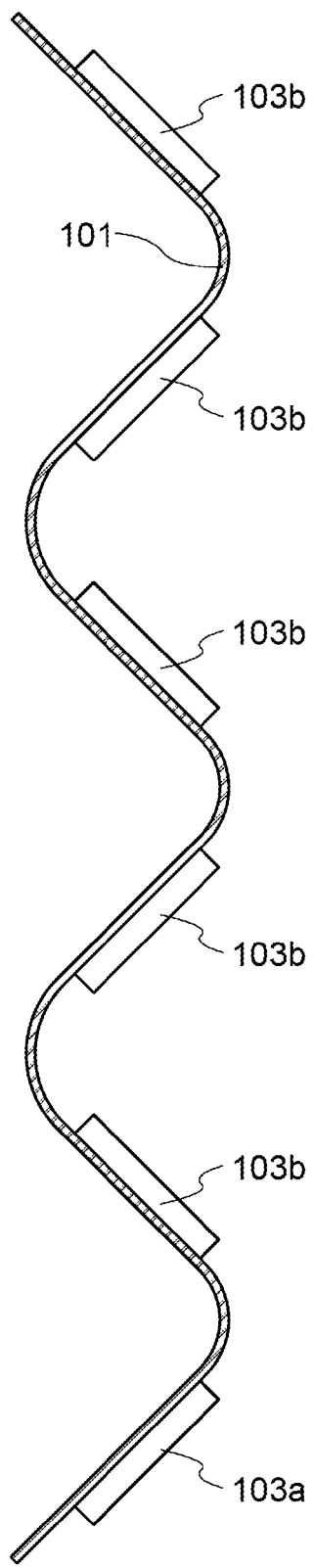
FIGS. 6A and 6B illustrate a display device of one embodiment.
Figure 6B:
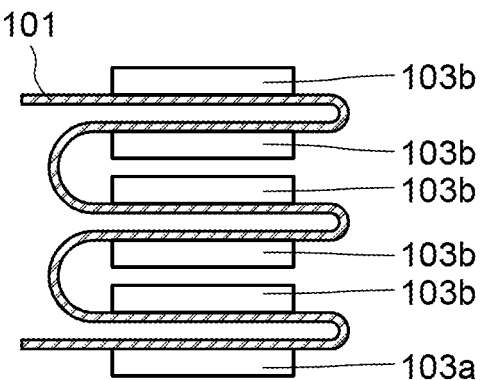

As illustrated in FIGS. 6A and 6B, the display panel 100 may be folded with the angles of the two adjacent supporting members adjusted such that the supporting members are inclined on sides opposite to each other.

The above is the description of the modification example.

Application Example

FIG. 7A illustrates an example in which the display device 10 of one embodiment of the present invention is set on a wall 15 in a room. FIGS. 7A and 7B illustrate a structure including a roll-up cord 11 which is in conjunction with the roll-up mechanism (not illustrated) of the display device 10. By pulling the roll-up cord 11, the state of the display surface of the display panel in the display device 10 can be changed to the folded state, the flat state, or the state between the folded state and the flat state. A cover 16 which stores the fixing portion (not illustrated) is provided in the upper portion of the display device 10, and thus the display panel can be stored therein by being folded. FIG. 7B illustrates a state in which the display device is stored in the cover 16. As illustrated in FIG. 7B, the whole display device 10 in a state where the display panel is folded is concealed by the cover 16 when not in use, leading to neater interior.

Furthermore, FIGS. 7A and 7B illustrate a table 20 including the display device of one embodiment of the present invention. FIGS. 7C and 7D are schematic cross-sectional views illustrating the table 20. The table 20 includes the display device on an inner side than a housing 21 and includes a light-transmitting cover 22 on an upper surface of the housing 21. For the cover 22, glass or plastic may be used, for example. As illustrated in FIG. 7C, when the display surface of the display device 10 is flat, an image displayed on the display surface can be viewed through the cover 22. When the display device 10 is not used, as illustrated in FIG. 7D, the display panel of the display device 10 is folded and stored in a portion which is not covered with the cover 22, and thus the table 20 can be used as a normal table.

Although an example in which the display device of one embodiment of the present invention is set on the wall or inside the table in the room is described here, one embodiment of the present invention is not limited thereto, and the display device of one embodiment of the present invention can be set in a variety of places. For example, the display device of one embodiment of the present invention may be set on a ceiling, a floor, a table, a column, or the like in an ordinary household, a meeting room, or the like. Furthermore, the display device of one embodiment of the present invention can be set for a variety of objects such as a commerce facility, a spacecraft, and a moving object such as a car, a bus, a train, or an airplane. In addition, when the display device is attached to a foldable frame or the like as described above, the display device can be used at any place.

The above is the description of the application examples.

At least part of this embodiment can be implemented in combination with any of the embodiments described in this specification as appropriate.

Embodiment 2

In this embodiment, structure examples of a light-emitting panel that is applicable to a display panel included in the display device of one embodiment of the present invention and an example of a method for manufacturing the light-emitting panel will be described.

Specific Example 1

Figure 8A:
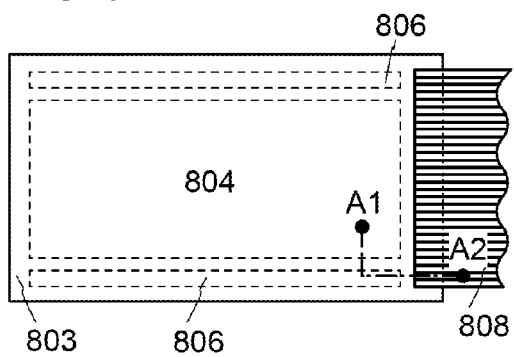
FIGS. 8A to 8D illustrate examples of a light-emitting panel of one embodiment.
Figure 8B:
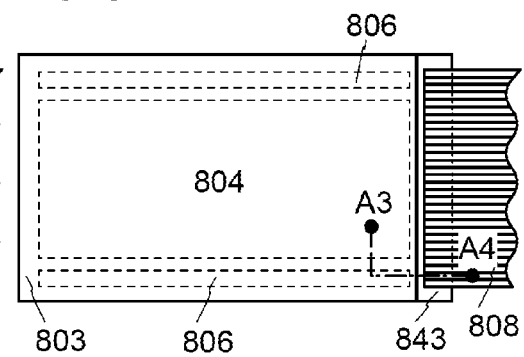
Figure 8C:
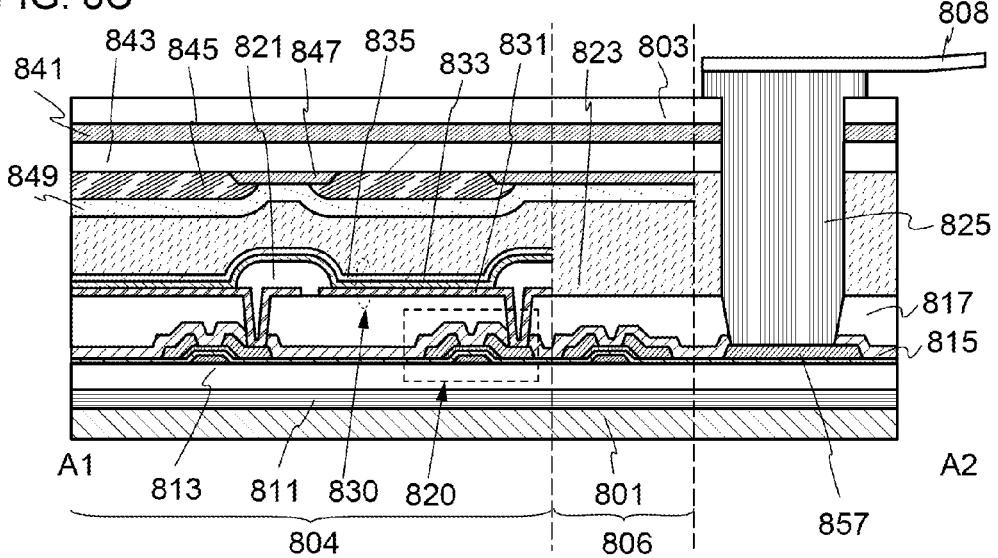

FIG. 8A is a plan view of a light-emitting panel, and FIG. 8C is an example of a cross-sectional view taken along dashed-dotted line A1-A2 in FIG. 8A. The light-emitting panel described in Specific Example 1 is a top-emission light-emitting panel using a color filter method. In this embodiment, the light-emitting panel can have, for example, a structure in which sub-pixels of three colors of red (R), green (G), and blue (B) express one color, or a structure in which sub-pixels of four colors of red (R), green (G), blue (B), and white (W) or sub-pixels of four colors of red (R), green (G), blue (B), and yellow (Y) express one color. There is no particular limitation on a color element, and colors other than R, G, B, and W, for example, yellow, cyan, and magenta, may be used.

The light-emitting panel illustrated in FIG. 8A includes a light-emitting portion 804, driver circuit portions 806, and a flexible printed circuit (FPC) 808. Light-emitting elements and transistors included in the light-emitting portion 804 and the driver circuit portions 806 are sealed by a substrate 801, a substrate 803, and a sealing layer 823.

The light-emitting panel illustrated in FIG. 8C includes the substrate 801, an adhesive layer 811, an insulating layer 813, a plurality of transistors, a conductive layer 857, an insulating layer 815, an insulating layer 817, a plurality of light-emitting elements, an insulating layer 821, the sealing layer 823, an overcoat 849, a coloring layer 845, a light-blocking layer 847, an insulating layer 843, an adhesive layer 841, and the substrate 803. The sealing layer 823, the overcoat 849, the insulating layer 843, the adhesive layer 841, and the substrate 803 transmit visible light.

The light-emitting portion 804 includes a transistor 820 and a light-emitting element 830 over the substrate 801 with the adhesive layer 811 and the insulating layer 813 provided between the substrate 801 and each of the transistor 820 and the light-emitting element 830. The light-emitting element 830 includes a lower electrode 831 over the insulating layer 817, an EL layer 833 over the lower electrode 831, and an upper electrode 835 over the EL layer 833. The lower electrode 831 is electrically connected to a source electrode or a drain electrode of the transistor 820. An end portion of the lower electrode 831 is covered with the insulating layer 821. The lower electrode 831 preferably reflects visible light. The upper electrode 835 transmits visible light.

The light-emitting portion 804 also includes the coloring layer 845 overlapping with the light-emitting element 830 and the light-blocking layer 847 overlapping with the insulating layer 821. The coloring layer 845 and the light-blocking layer 847 are covered with the overcoat 849. The space between the light-emitting element 830 and the overcoat 849 is filled with the sealing layer 823.

The insulating layer 815 has an effect of suppressing diffusion of impurities into a semiconductor included in the transistor. As the insulating layer 817, an insulating layer having a planarization function is preferably selected in order to reduce surface unevenness due to the transistor.

The driver circuit portion 806 include a plurality of transistors over the substrate 801 with the adhesive layer 811 and the insulating layer 813 provided between the substrate 801 and the transistors. FIG. 8C illustrates one of the transistors included in the driver circuit portion 806.

The insulating layer 813 and the substrate 801 are attached to each other with the adhesive layer 811. The insulating layer 843 and the substrate 803 are attached to each other with the adhesive layer 841. It is preferable to use films with low water permeability for the insulating layers 813 and 843, in which case an impurity such as water can be prevented from entering the light-emitting element 830 or the transistor 820, leading to improved reliability of the light-emitting panel.

The conductive layer 857 is electrically connected to an external input terminal through which a signal (e.g., a video signal, a clock signal, a start signal, and a reset signal) or a potential from the outside is transmitted to the driver circuit portion 806. Here, an example in which the FPC 808 is provided as the external input terminal is described. To prevent an increase in the number of fabrication steps, the conductive layer 857 is preferably formed using the same material and step as the electrode or the wiring in the light-emitting portion or the driver circuit portion. Here, an example in which the conductive layer 857 is formed using the same material and step as the electrodes included in the transistor 820 is described.

In the light-emitting panel illustrated in FIG. 8C, a connector 825 is positioned over the substrate 803. The connector 825 is connected to the conductive layer 857 through an opening provided in the substrate 803, the adhesive layer 841, the insulating layer 843, the sealing layer 823, the insulating layer 817, and the insulating layer 815. The connector 825 is also connected to the FPC 808. The FPC 808 and the conductive layer 857 are electrically connected to each other via the connector 825. In the case where the conductive layer 857 overlaps with the substrate 803, the conductive layer 857, the connector 825, and the FPC 808 can be electrically connected to one another by forming an opening in the substrate 803 (or using a substrate having an opening portion).

The light-emitting panel in Specific Example 1 can be manufactured in the following manner: the insulating layer 813, the transistor 820, and the light-emitting element 830 are formed over a formation substrate with high heat resistance; the formation substrate is separated; and the insulating layer 813, the transistor 820, and the light-emitting element 830 are transferred to the substrate 801 and attached thereto with the adhesive layer 811. The light-emitting panel in Specific Example 1 can be manufactured in the following manner: the insulating layer 843, the coloring layer 845, and the light-blocking layer 847 are formed over a formation substrate with high heat resistance; the formation substrate is separated; and the insulating layer 843, the coloring layer 845, and the light-blocking layer 847 are transferred to the substrate 803 and attached thereto with the adhesive layer 841.

In the case where a material with low heat resistance (e.g., resin) is used for a substrate, it is difficult to expose the substrate to high temperatures in the manufacturing process. Thus, there is a limitation on conditions for forming a transistor and an insulating layer over the substrate. In the case of using a material with high water permeability (e.g., a resin), it is preferable to form a film at high temperatures to have low water permeability. In the manufacturing method of this embodiment, a transistor and the like can be formed over a formation substrate with high heat resistance; thus, a highly reliable transistor and a film with sufficiently low water permeability can be formed at high temperatures. Then, the transistor and the film are transferred to the substrate 801 and the substrate 803, whereby a highly reliable light-emitting panel can be manufactured. Thus, according to one embodiment of the present invention, a thin and/or lightweight and highly reliable light-emitting panel can be provided. Details of the manufacturing method will be described later.

Specific Example 2

Figure 8D:
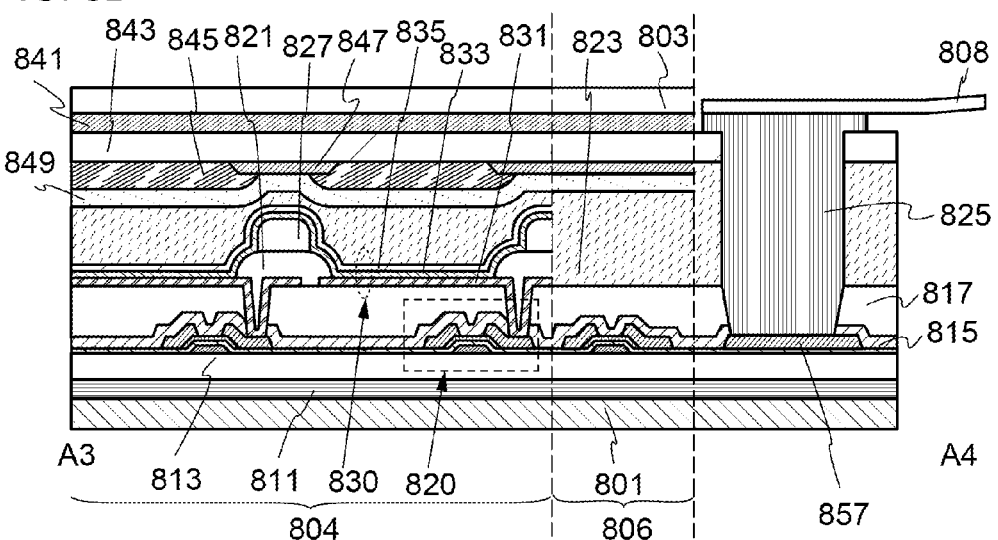

FIG. 8B is a plan view of a light-emitting panel, and FIG. 8D is an example of a cross-sectional view taken along dashed-dotted line A3-A4 in FIG. 8B. The light-emitting panel described in Specific Example 2 is a top-emission light-emitting panel using a color filter method, which is different from that described in Specific Example 1. Portions different from those in Specific Example 1 will be described in detail here and the descriptions of portions common to those in Specific Example 1 will be omitted.

The light-emitting panel illustrated in FIG. 8D is different from the light-emitting panel illustrated in FIG. 8C in the aspects below.

The light-emitting panel illustrated in FIG. 8D includes a spacer 827 over the insulating layer 821. The spacer 827 can adjust the distance between the substrate 801 and the substrate 803.

In the light-emitting panel illustrated in FIG. 8D, the substrate 801 and the substrate 803 have different sizes. The connector 825 is positioned over the insulating layer 843 and thus does not overlap with the substrate 803. The connector 825 is connected to the conductive layer 857 through an opening provided in the insulating layer 843, the sealing layer 823, the insulating layer 817, and the insulating layer 815. Since no opening needs to be provided in the substrate 803, there is no limitation on the material of the substrate 803.

Specific Example 3

Figure 9A:
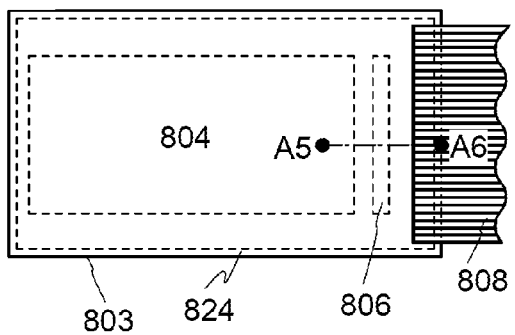
FIGS. 9A to 9E illustrate examples of a light-emitting panel of one embodiment.
Figure 9B:
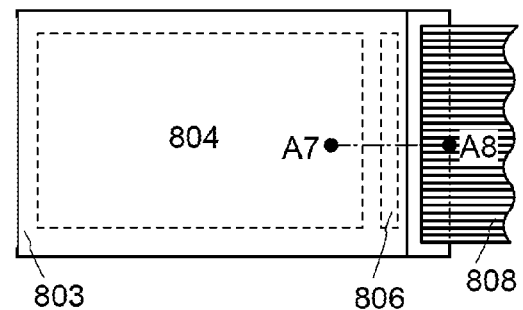
Figure 9C:
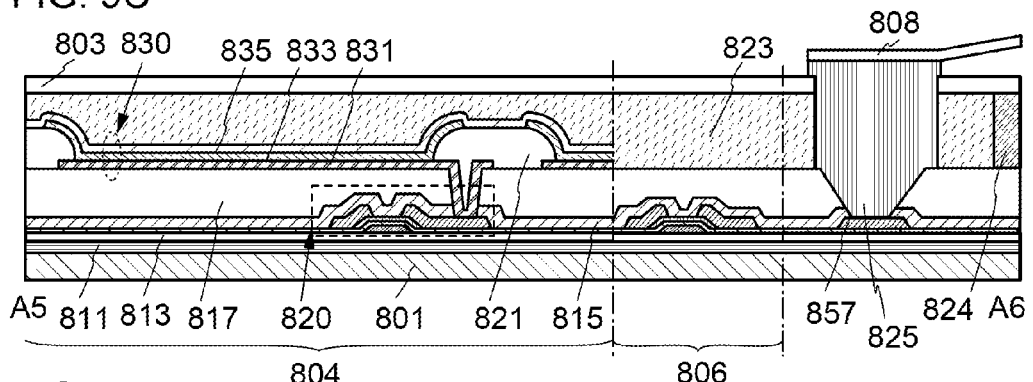

FIG. 9A is a plan view of a light-emitting panel, and FIG. 9C is an example of a cross-sectional view taken along dashed-dotted line A5-A6 in FIG. 9A. The light-emitting panel described in Specific Example 3 is a top-emission light-emitting panel using a separate coloring method.

The light-emitting panel illustrated in FIG. 9A includes the light-emitting portion 804, the driver circuit portion 806, and the FPC 808. Light-emitting elements and transistors included in the light-emitting portion 804 and the driver circuit portion 806 are sealed by the substrate 801, the substrate 803, a frame-like sealing layer 824, and the sealing layer 823.

The light-emitting panel illustrated in FIG. 9C includes the substrate 801, the adhesive layer 811, the insulating layer 813, a plurality of transistors, the conductive layer 857, the insulating layer 815, the insulating layer 817, a plurality of light-emitting elements, the insulating layer 821, the sealing layer 823, the frame-like sealing layer 824, and the substrate 803. The sealing layer 823 and the substrate 803 transmit visible light.

The frame-like sealing layer 824 preferably has a higher gas barrier property than the sealing layer 823 to prevent entry of moisture and oxygen from the outside into the light-emitting panel. Thus, the light-emitting panel can be highly reliable.

In Specific Example 3, light emitted from the light-emitting element 830 in the light-emitting panel is extracted through the sealing layer 823. For this reason, the sealing layer 823 preferably has a higher light-transmitting property and a higher refractive index than the frame-like sealing layer 824. In addition, it is preferable that a reduction in the volume of the sealing layer 823 by curing be smaller than that of the frame-like sealing layer 824.

The light-emitting portion 804 includes the transistor 820 and the light-emitting element 830 over the substrate 801 with the adhesive layer 811 and the insulating layer 813 provided between the substrate 801 and each of the transistor 820 and the light-emitting element 830. The light-emitting element 830 includes the lower electrode 831 over the insulating layer 817, the EL layer 833 over the lower electrode 831, and the upper electrode 835 over the EL layer 833. The lower electrode 831 is electrically connected to the source electrode or the drain electrode of the transistor 820. The end portion of the lower electrode 831 is covered with the insulating layer 821. The lower electrode 831 preferably reflects visible light. The upper electrode 835 transmits visible light.

The driver circuit portion 806 includes a plurality of transistors over the substrate 801 with the adhesive layer 811 and the insulating layer 813 provided between the substrate 801 and the transistors. FIG. 9C illustrates one of the transistors included in the driver circuit portion 806.

The insulating layer 813 and the substrate 801 are attached to each other with the adhesive layer 811. It is preferable to use a film with low water permeability for the insulating layer 813, in which case an impurity such as water can be prevented from entering the light-emitting element 830 or the transistor 820, leading to improved reliability of the light-emitting panel.

The conductive layer 857 is electrically connected to an external input terminal through which a signal or a potential from the outside is transmitted to the driver circuit portion 806. Here, an example in which the FPC 808 is provided as the external input terminal is described. Moreover, here, an example in which the conductive layer 857 is formed using the same material and step as the electrodes included in the transistor 820 is described.

In the light-emitting panel illustrated in FIG. 9C, the connector 825 is positioned over the substrate 803. The connector 825 is connected to the conductive layer 857 through an opening provided in the substrate 803, the sealing layer 823, the insulating layer 817, and the insulating layer 815. The connector 825 is also connected to the FPC 808. The FPC 808 and the conductive layer 857 are electrically connected to each other via the connector 825.

The light-emitting panel in Specific Example 3 can be manufactured in the following manner: the insulating layer 813, the transistor 820, and the light-emitting element 830 are formed over a formation substrate with high heat resistance; the formation substrate is separated; and the insulating layer 813, the transistor 820, and the light-emitting element 830 are transferred to the substrate 801 and attached thereto with the adhesive layer 811. A transistor and the like can be formed over a formation substrate with high heat resistance; thus, a highly reliable transistor and a film with sufficiently low water permeability can be formed at high temperatures. Then, the transistor and the film are transferred to the substrate 801, whereby a highly reliable light-emitting panel can be manufactured. Thus, according to one embodiment of the present invention, a thin and/or lightweight and highly reliable light-emitting panel can be provided.

Specific Example 4

Figure 9D:
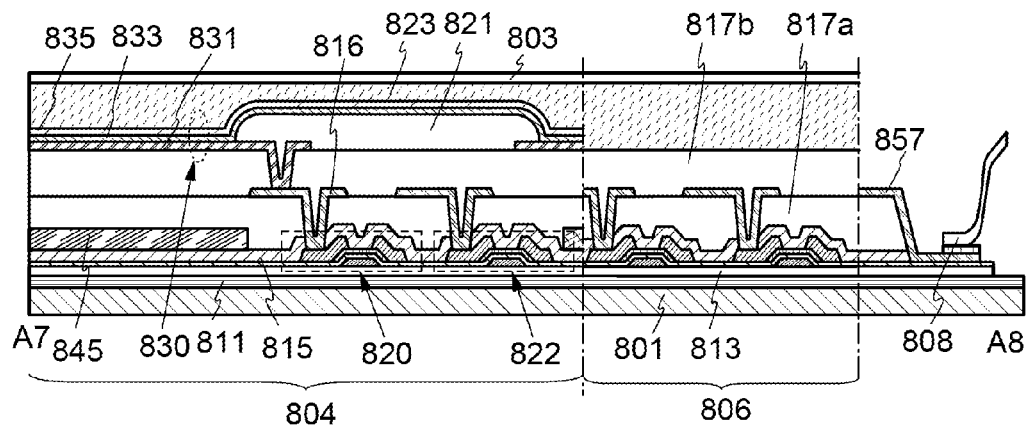

FIG. 9B is a plan view of a light-emitting panel, and FIG. 9D is an example of a cross-sectional view taken along dashed-dotted line A7-A8 in FIG. 9B. The light-emitting panel described in Specific Example 4 is a bottom-emission light-emitting panel using a color filter method.

The light-emitting panel illustrated in FIG. 9D includes the substrate 801, the adhesive layer 811, the insulating layer 813, a plurality of transistors, the conductive layer 857, the insulating layer 815, the coloring layer 845, an insulating layer 817a, an insulating layer 817b, a conductive layer 816, a plurality of light-emitting elements, the insulating layer 821, the sealing layer 823, and the substrate 803. The substrate 801, the adhesive layer 811, the insulating layer 813, the insulating layer 815, the insulating layer 817a, and the insulating layer 817b transmit visible light.

The light-emitting portion 804 includes the transistor 820, a transistor 822, and the light-emitting element 830 over the substrate 801 with the adhesive layer 811 and the insulating layer 813 provided between the substrate 801 and each of the transistor 820, the transistor 822, and the light-emitting element 830. The light-emitting element 830 includes the lower electrode 831 over the insulating layer 817, the EL layer 833 over the lower electrode 831, and the upper electrode 835 over the EL layer 833. The lower electrode 831 is electrically connected to the source electrode or the drain electrode of the transistor 820. The end portion of the lower electrode 831 is covered with the insulating layer 821. The upper electrode 835 preferably reflects visible light. The lower electrode 831 transmits visible light. The coloring layer 845 that overlaps with the light-emitting element 830 can be provided anywhere; for example, the coloring layer 845 may be provided between the insulating layers 817a and 817b or between the insulating layers 815 and 817a.

The driver circuit portion 806 includes a plurality of transistors over the substrate 801 with the adhesive layer 811 and the insulating layer 813 provided between the substrate 801 and the transistors. FIG. 9D illustrates two of the transistors included in the driver circuit portion 806.

The insulating layer 813 and the substrate 801 are attached to each other with the adhesive layer 811. It is preferable to use a film with low water permeability for the insulating layer 813, in which case an impurity such as water can be prevented from entering the light-emitting element 830, the transistor 820, or the transistor 822, leading to improved reliability of the light-emitting panel.

The conductive layer 857 is electrically connected to an external input terminal through which a signal or a potential from the outside is transmitted to the driver circuit portion 806. Here, an example in which the FPC 808 is provided as the external input terminal is described. Moreover, here, an example in which the conductive layer 857 is formed using the same material and step as the conductive layer 816 is described.

The light-emitting panel in Specific Example 4 can be manufactured in the following manner: the insulating layer 813, the transistor 820, the light-emitting element 830, and the like are formed over a formation substrate with high heat resistance; the formation substrate is separated; and the insulating layer 813, the transistor 820, the light-emitting element 830, and the like are transferred to the substrate 801 and attached thereto with the adhesive layer 811. A transistor and the like can be formed over a formation substrate with high heat resistance; thus, a highly reliable transistor and a film with sufficiently low water permeability can be formed at high temperatures. Then, the transistor and the film are transferred to the substrate 801, whereby a highly reliable light-emitting panel can be manufactured. Thus, according to one embodiment of the present invention, a thin and/or lightweight and highly reliable light-emitting panel can be provided.

Specific Example 5

Figure 9E:
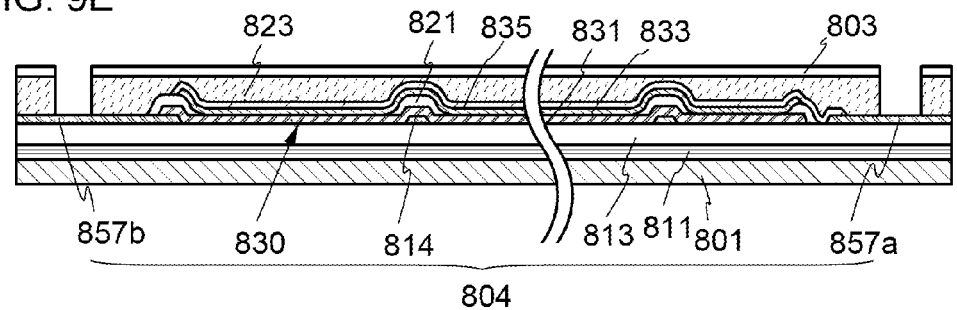

FIG. 9E illustrates an example of a light-emitting panel that is different from those described in Specific Examples 1 to 4.

The light-emitting panel illustrated in FIG. 9E includes the substrate 801, the adhesive layer 811, the insulating layer 813, a conductive layer 814, a conductive layer 857a, a conductive layer 857b, the light-emitting element 830, the insulating layer 821, the sealing layer 823, and the substrate 803.

The conductive layer 857a and the conductive layer 857b, which serve as external connection electrodes of the light-emitting panel, can each be electrically connected to an FPC or the like.

The light-emitting element 830 includes the lower electrode 831, the EL layer 833, and the upper electrode 835. The end portion of the lower electrode 831 is covered with the insulating layer 821. The light-emitting element 830 is a bottom-emission, top-emission, or dual-emission light-emitting element. An electrode, a substrate, an insulating layer, and the like on the light extraction side transmit visible light. The conductive layer 814 is electrically connected to the lower electrode 831.

The substrate through which light is extracted may have, as a light extraction structure, a hemispherical lens, a micro lens array, a film provided with an uneven surface structure, a light diffusing film, or the like. For example, the substrate with a light extraction structure can be formed by attaching the above lens or film to a resin substrate with an adhesive or the like having substantially the same refractive index as the substrate, or the lens or film.

The conductive layer 814 is preferably, though not necessarily, provided because voltage drop due to the resistance of the lower electrode 831 can be prevented. In addition, for a similar purpose, a conductive layer electrically connected to the upper electrode 835 may be provided over the insulating layer 821, the EL layer 833, the upper electrode 835, or the like.

The conductive layer 814 can be a single layer or a stacked layer formed using a material selected from copper, titanium, tantalum, tungsten, molybdenum, chromium, neodymium, scandium, nickel, or aluminum; an alloy material containing any of these materials as its main component; or the like. The thickness of the conductive layer 814 can be, for example, greater than or equal to 0.1 μm and less than or equal to 3 μm, preferably greater than or equal to 0.1 μm and less than or equal to 0.5 μm.

When a paste (e.g., silver paste) is used as a material for the conductive layer electrically connected to the upper electrode 835, metal particles forming the conductive layer aggregate; therefore, the surface of the conductive layer is rough and has many gaps. Thus, it is difficult for the EL layer 833 to completely cover the conductive layer; accordingly, the upper electrode and the conductive layer are preferably electrically connected to each other easily.

The light-emitting panel in Specific Example 5 can be manufactured in the following manner: the insulating layer 813, the light-emitting element 830, and the like are formed over a formation substrate with high heat resistance; the formation substrate is separated; and the insulating layer 813, the light-emitting element 830, and the like are transferred to the substrate 801 and attached thereto with the adhesive layer 811. The insulating layer 813 and the like with sufficiently low water permeability are formed over the formation substrate with high heat resistance at high temperatures and then are transferred to the substrate 801, whereby a highly reliable light-emitting panel can be manufactured. Thus, according to one embodiment of the present invention, a thin and/or lightweight and highly reliable light-emitting panel can be provided.

Note that although the case where the light-emitting element is used as a display element is described here, one embodiment of the present invention is not limited thereto.

In this specification and the like, for example, a display element, a display device or a display panel which is a device including a display element, a light-emitting element, and a light-emitting device which is a device including a light-emitting element can employ a variety of modes or can include a variety of elements. A display element, a display device, a display panel, a light-emitting element, or a light-emitting device includes, for example, at least one of an electroluminescence (EL) element (e.g., an EL element including organic and inorganic materials, an organic EL element, or an inorganic EL element), an LED (e.g., a white LED, a red LED, a green LED, or a blue LED), a transistor (a transistor that emits light depending on current), an electron emitter, a liquid crystal element, electronic ink, an electrophoretic element, a grating light valve (GLV), a plasma display panel (PDP), a display element using micro electro mechanical system (MEMS), a digital micro mirror device (DMD), a digital micro shutter (DMS), MIRASOL (registered trademark), an interferometric modulator (IMOD) element, a MEMS shutter display element, an optical-interference-type MEMS display element, an electrowetting element, a piezoelectric ceramic display, and a display element including a carbon nanotube. Other than the above, the element may include a display medium whose contrast, luminance, reflectivity, transmittance, or the like is changed by electrical or magnetic effect. Note that examples of display devices having EL elements include an EL display. Examples of display devices including electron emitters are a field emission display (FED) and an SED-type flat panel display (SED: surface-conduction electron-emitter display). Examples of display devices including liquid crystal elements include a liquid crystal display (e.g., a transmissive liquid crystal display, a transflective liquid crystal display, a reflective liquid crystal display, a direct-view liquid crystal display, or a projection liquid crystal display). Examples of a display device including electronic ink, Electronic Liquid Powder®, or an electrophoretic element include electronic paper. In the case of a transflective liquid crystal display or a reflective liquid crystal display, some of or all of pixel electrodes function as reflective electrodes. For example, some or all of pixel electrodes are formed to contain aluminum, silver, or the like. In such a case, a memory circuit such as an SRAM can be provided under the reflective electrodes, leading to lower power consumption. Note that in the case of using an LED, graphene or graphite may be provided under an electrode or a nitride semiconductor of the LED. Graphene or graphite may be a multilayer film in which a plurality of layers are stacked. As described above, provision of graphene or graphite enables easy formation of a nitride semiconductor film thereover, such as an n-type GaN semiconductor layer including crystals. Furthermore, a p-type GaN semiconductor layer including crystals or the like can be provided thereover, and thus the LED can be formed. Note that an MN layer may be provided between the n-type GaN semiconductor layer including crystals and graphene or graphite. The GaN semiconductor layers included in the LED may be formed by MOCVD. Note that when the graphene is provided, the GaN semiconductor layers included in the LED can also be formed by a sputtering method.

Examples of Materials

Next, materials and the like that can be used for a light-emitting panel are described. Note that description on the components already described in this specification is omitted in some cases.

For each of the substrates, a material such as glass, quartz, an organic resin, a metal, or an alloy can be used. For the substrate on the side from which light from the light-emitting element is extracted, a material which transmits that light is used.

It is particularly preferable to use a flexible substrate. For example, an organic resin; a glass material, a metal, or an alloy that is thin enough to have flexibility; or the like can be used.

An organic resin, which has a specific gravity smaller than that of glass, is preferably used for the flexible substrate, in which case the light-emitting panel can be more lightweight than in the case where glass is used.

The substrates are preferred to be formed using a material with high toughness. In that case, a light-emitting panel with high impact resistance that is robust can be provided. For example, when an organic resin substrate, a thin metal substrate, or a thin alloy substrate is used, the light-emitting panel can be lighter and more robust than the case where a glass substrate is used.

A metal material and an alloy material, which have high thermal conductivity, are preferred because they can easily conduct heat to the whole substrate and accordingly can prevent a local temperature rise in the light-emitting panel. The thickness of a substrate using a metal material or an alloy material is preferably greater than or equal to 10 μm and less than or equal to 200 μm, further preferably greater than or equal to 20 μm and less than or equal to 50 μm.

Examples of a material for the metal substrate or the alloy substrate include, but not limited to, a metal such as aluminum, copper, iron, titanium, or nickel; and an alloy containing one or more metals selected from the metals. As the alloy, for example, an aluminum alloy or stainless steel can be favorably used.

Furthermore, when a material with high thermal emissivity is used for the substrate, the surface temperature of the light-emitting panel can be prevented from rising, leading to prevention of breakage or a decrease in reliability of the light-emitting panel. For example, the substrate may have a stacked-layer structure of a metal substrate and a layer with high thermal emissivity (e.g., the layer can be formed using a metal oxide or a ceramic material).

Examples of such a material having flexibility and a light-transmitting property include polyester resins such as polyethylene terephthalate (PET) and polyethylene naphthalate (PEN), a polyacrylonitrile resin, a polyimide resin, a polymethyl methacrylate resin, a polycarbonate (PC) resin, a polyethersulfone (PES) resin, a polyamide resin, a cycloolefin resin, a polystyrene resin, a polyamide imide resin, a polyvinyl chloride resin, and a polytetrafluoroethylene (PTFE) resin. In particular, a material whose coefficient of thermal expansion is low is preferred, and for example, a polyamide imide resin, a polyimide resin, or PET can be suitably used. A substrate in which a fibrous body is impregnated with a resin (also referred to as prepreg) or a substrate whose coefficient of thermal expansion is reduced by mixing an organic resin with an inorganic filler can also be used.

The flexible substrate may have a stacked-layer structure in which a hard coat layer (such as a silicon nitride layer) by which a surface of a light-emitting device is protected from damage, a layer (such as an aramid resin layer) that can disperse pressure, or the like is stacked over a layer of any of the above-mentioned materials.

The flexible substrate may be formed by stacking a plurality of layers. When a glass layer is used, a barrier property against water and oxygen can be improved and thus a reliable light-emitting panel can be provided.

For example, a flexible substrate in which a glass layer, an adhesive layer, and an organic resin layer are stacked from the side closer to a light-emitting element can be used. The thickness of the glass layer is greater than or equal to 20 µm and less than or equal to 200 µm, preferably greater than or equal to 25 µm and less than or equal to 100 µm. With such a thickness, the glass layer can have both an excellent barrier property against water and oxygen and a high flexibility. The thickness of the organic resin layer is greater than or equal to 10 µm and less than or equal to 200 µm, preferably greater than or equal to 20 µm and less than or equal to 50 µm. Providing such organic resin layer outside the glass layer, occurrence of a crack or a break in the glass layer can be suppressed and mechanical strength can be improved. With the substrate that includes such a composite material of a glass material and an organic resin, a highly reliable and flexible light-emitting panel can be provided.

As the adhesive layer or the sealing layer, a variety of curable adhesives such as a reactive curable adhesive, a thermosetting adhesive, an anaerobic adhesive, and a photo curable adhesive such as an ultraviolet curable adhesive can be used. Examples of these adhesives include an epoxy resin, an acrylic resin, a silicone resin, a phenol resin, a polyimide resin, an imide resin, a polyvinyl chloride (PVC) resin, a polyvinyl butyral (PVB) resin, and an ethylene vinyl acetate (EVA) resin. A material with low moisture permeability, such as an epoxy resin, is particularly preferable. Alternatively, a two-component-mixture-type resin may be used. Alternatively, an adhesive sheet or the like may be used.

The resin may include a drying agent. As the drying agent, for example, a substance that adsorbs moisture by chemical adsorption, such as an oxide of an alkaline earth metal (e.g., calcium oxide or barium oxide), can be used. Alternatively, a substance that adsorbs moisture by physical adsorption, such as zeolite or silica gel, may be used. The drying agent is preferably included because it can prevent an impurity such as moisture from entering the functional element, thereby improving the reliability of the light-emitting panel.

In addition, it is preferable to mix a filler with a high refractive index or light-scattering member into the resin, in which case the efficiency of light extraction from the light-emitting element can be improved. For example, titanium oxide, barium oxide, zeolite, zirconium, or the like can be used.

There is no particular limitation on the structure of the transistors in the light-emitting panel. For example, a forward staggered transistor or an inverted staggered transistor may be used. A top-gate transistor or a bottom-gate transistor may be used. There is no particular limitation on a semiconductor material used for the transistors; for example, silicon, germanium, silicon carbide, or gallium nitride can be used. Alternatively, an oxide semiconductor containing at least one of indium, gallium, and zinc, such as an In—Ga—Zn-based metal oxide, may be used.

There is no particular limitation on the crystallinity of a semiconductor material used for the transistors, and an amorphous semiconductor or a semiconductor having crystallinity (a microcrystalline semiconductor, a polycrystalline semiconductor, a single-crystal semiconductor, or a semiconductor partly including crystal regions) may be used. It is preferable that a semiconductor having crystallinity be used, in which case deterioration of the transistor characteristics can be suppressed.

Here, an oxide semiconductor is preferably used for semiconductor devices such as transistors used for pixels, driver circuits, touch sensors described later, and the like. In particular, an oxide semiconductor having a wider band gap than silicon is preferably used. A semiconductor material having a wider band gap and a lower carrier density than silicon is preferably used because off-state current of the transistor can be reduced.

For example, the oxide semiconductor preferably contains at least indium (In) or zinc (Zn). More preferably, the oxide semiconductor contains an oxide represented by an In-M-Zn-based oxide (M is a metal such as Al, Ti, Ga, Ge, Y, Zr, Sn, La, Ce, or Hf).

As the semiconductor layer, it is particularly preferable to use an oxide semiconductor film including a plurality of crystal parts whose c-axes are aligned perpendicular to a surface on which the semiconductor layer is formed or the top surface of the semiconductor layer and in which a grain boundary is not observed between adjacent crystal parts.

There is no grain boundary in such an oxide semiconductor; therefore, generation of a crack in an oxide semiconductor film which is caused by stress when a display panel is bent is prevented. Therefore, such an oxide semiconductor can be preferably used for a flexible display panel which is used in a bent state, or the like.

The use of such materials for the semiconductor layer makes it possible to provide a highly reliable transistor in which a change in the electrical characteristics is suppressed.

Charge accumulated in a capacitor through a transistor can be held for a long time because of the low off-state current of the transistor. When such a transistor is used for a pixel, operation of a driver circuit can be stopped while a gray scale of an image displayed in each display region is maintained. As a result, an electronic device with an extremely low power consumption can be obtained.

For stable characteristics of the transistor, a base film is preferably provided. The base film can be formed with an inorganic insulating film such as a silicon oxide film, a silicon nitride film, a silicon oxynitride film, or a silicon nitride oxide film to have a single-layer structure or a stacked-layer structure. The base film can be formed by a sputtering method, a chemical vapor deposition (CVD) method (e.g., a plasma CVD method, a thermal CVD method, or a metal organic CVD (MOCVD) method), an atomic layer deposition (ALD) method, a coating method, a printing method, or the like. Note that the base film is not necessarily provided. In each of the above Structure Examples, the insulating layer 813 can serve as a base film of the transistor.

As the light-emitting element, a self-luminous element can be used, and an element whose luminance is controlled by current or voltage is included in the category of the light-emitting element. For example, a light-emitting diode (LED), an organic EL element, an inorganic EL element, or the like can be used.

The light-emitting element may be a top emission, bottom emission, or dual emission light-emitting element. A conductive film that transmits visible light is used as the electrode through which light is extracted. A conductive film that reflects visible light is preferably used as the electrode through which light is not extracted.

The conductive film that transmits visible light can be formed using, for example, indium oxide, indium tin oxide (ITO), indium zinc oxide, zinc oxide, or zinc oxide to which gallium is added. Alternatively, a film of a metal material such as gold, silver, platinum, magnesium, nickel, tungsten, chromium, molybdenum, iron, cobalt, copper, palladium, or titanium; an alloy containing any of these metal materials; or a nitride of any of these metal materials (e.g., titanium nitride) can be formed thin so as to have a light-transmitting property. Alternatively, a stack of any of the above materials can be used as the conductive layer. For example, a stacked film of ITO and an alloy of silver and magnesium is preferably used, in which case conductivity can be increased. Further alternatively, graphene or the like may be used.

For the conductive film that reflects visible light, for example, a metal material such as aluminum, gold, platinum, silver, nickel, tungsten, chromium, molybdenum, iron, cobalt, copper, or palladium or an alloy containing any of these metal materials can be used. Lanthanum, neodymium, germanium, or the like may be added to the metal material or the alloy. Furthermore, an alloy containing aluminum (an aluminum alloy) such as an alloy of aluminum and titanium, an alloy of aluminum and nickel, or an alloy of aluminum and neodymium; or an alloy containing silver such as an alloy of silver and copper, an alloy of silver, copper, and palladium, or an alloy of silver and magnesium can be used for the conductive film. An alloy of silver and copper is preferable because of its high heat resistance. Moreover, a metal film or a metal oxide film is stacked on an aluminum alloy film, whereby oxidation of the aluminum alloy film can be suppressed. Examples of a material for the metal film or the metal oxide film are titanium and titanium oxide. Alternatively, the conductive film having a property of transmitting visible light and a film containing any of the above metal materials may be stacked. For example, a stacked film of silver and ITO or a stacked film of an alloy of silver and magnesium and ITO can be used.

The electrodes may be formed separately by an evaporation method or a sputtering method. Alternatively, a discharging method such as an ink-jet method, a printing method such as a screen printing method, or a plating method may be used.

When a voltage higher than the threshold voltage of the light-emitting element is applied between the lower electrode 831 and the upper electrode 835, holes are injected to the EL layer 833 from the anode side and electrons are injected to the EL layer 833 from the cathode side. The injected electrons and holes are recombined in the EL layer 833 and a light-emitting substance contained in the EL layer 833 emits light.

The EL layer 833 includes at least a light-emitting layer. In addition to the light-emitting layer, the EL layer 833 may further include one or more layers containing any of a substance with a high hole-injection property, a substance with a high hole-transport property, a hole-blocking material, a substance with a high electron-transport property, a substance with a high electron-injection property, a substance with a bipolar property (a substance with a high electron- and hole-transport property), and the like.

For the EL layer 833, either a low molecular compound or a high molecular compound can be used, and an inorganic compound may also be used. Each of the layers included in the EL layer 833 can be formed by any of the following methods: an evaporation method (including a vacuum evaporation method), a transfer method, a printing method, an ink-jet method, a coating method, and the like.

In the case where a light-emitting element emitting white light is used as the light-emitting element 830, the EL layer 833 preferably contains two or more kinds of light-emitting substances. For example, light-emitting substances are selected so that two or more light-emitting substances emit complementary colors to obtain white light emission. Specifically, it is preferable to contain two or more selected from light-emitting substances emitting light of red (R), green (G), blue (B), yellow (Y), orange (O), and the like and light-emitting substances emitting light containing two or more of spectral components of R, G, and B. The light-emitting element 830 preferably emits light with a spectrum having two or more peaks in the wavelength range of a visible light region (e.g., 350 nm to 750 nm). An emission spectrum of a material emitting light having a peak in the wavelength range of a yellow light preferably includes spectral components also in the wavelength range of a green light and a red light.

More preferably, a light-emitting layer containing a light-emitting material emitting light of one color and a light-emitting layer containing a light-emitting material emitting light of another color are stacked in the EL layer 833. For example, the plurality of light-emitting layers in the EL layer 833 may be stacked in contact with each other or may be stacked with a separation layer therebetween. For example, a separation layer may be provided between a fluorescent layer and a phosphorescent layer.

The separation layer can be provided, for example, to prevent energy transfer by the Dexter mechanism (particularly triplet energy transfer) from a phosphorescent material or the like in an excited state which is generated in the phosphorescent layer to a fluorescent material or the like in the fluorescent layer. The thickness of the separation layer may be several nanometers. Specifically, the thickness of the separation layer may be greater than or equal to 0.1 nm and less than or equal to 20 nm, greater than or equal to 1 nm and less than or equal to 10 nm, or greater than or equal to 1 nm and less than or equal to 5 nm. The separation layer contains a single material (preferably, a bipolar substance) or a plurality of materials (preferably, a hole-transport material and an electron-transport material).

The separation layer may be formed using a material contained in a light-emitting layer in contact with the separation layer. This facilitates the manufacture of the light-emitting element and reduces the drive voltage. For example, in the case where the phosphorescent layer contains a host material, an assist material, and the phosphorescent material (a guest material), the separation layer may contain the host material and the assist material. In other words, the separation layer includes a region not containing the phosphorescent material and the phosphorescent layer includes a region containing the phosphorescent material in the above structure. Accordingly, the separation layer and the phosphorescent layer can be evaporated separately depending on whether a phosphorescent material is used or not. With such a structure, the separation layer and the phosphorescent layer can be formed in the same chamber. Thus, the manufacturing cost can be reduced.

The light-emitting element 830 may be a single element including one EL layer or a tandem element in which a plurality of EL layers are stacked with a charge generation layer therebetween.

The light-emitting element is preferably provided between a pair of insulating films with low water permeability. Thus, an impurity such as water can be prevented from entering the light-emitting element, leading to prevention of a decrease in the reliability of the light-emitting device.

As an insulating film with low water permeability, a film containing nitrogen and silicon such as a silicon nitride film or a silicon nitride oxide film, a film containing nitrogen and aluminum such as an aluminum nitride film, or the like can be used.

Alternatively, a silicon oxide film, a silicon oxynitride film, an aluminum oxide film, or the like can be used.

For example, the water vapor transmittance of the insulating film with low water permeability is lower than or equal to $1\times10^{-5}$ [g/m$^2$·day], preferably lower than or equal to $1\times10^{-6}$ [g/m$^2$·day], further preferably lower than or equal to $1\times10^{-7}$ [g/m$^2$·day], still further preferably lower than or equal to $1\times10^{-8}$ [g/m$^2$·day].

The insulating layers 813 and 843 are each preferably formed using an insulating film with low water permeability.

As the insulating layer 815, for example, an inorganic insulating film such as a silicon oxide film, a silicon oxynitride film, or an aluminum oxide film can be used. For example, as each of the insulating layers 817, 817*a*, and 817*b*, an organic material such as polyimide, acrylic, polyamide, polyimide amide, or a benzocyclobutene-based resin can be used. Alternatively, a low-dielectric constant material (a low-k material) or the like can be used. Furthermore, each of the insulating layers may be formed by stacking a plurality of insulating films.

The insulating layer 821 is formed using an organic insulating material or an inorganic insulating material. As the resin, for example, a polyimide resin, a polyamide resin, an acrylic resin, a siloxane resin, an epoxy resin, or a phenol resin can be used. It is particularly preferable that the insulating layer 821 be formed to have an inclined side wall with curvature, using a photosensitive resin material.

There is no particular limitation on the method for forming the insulating layer 821; a photolithography method, a sputtering method, an evaporation method, a droplet discharging method (e.g., an ink-jet method), a printing method (e.g., a screen printing method or an off-set printing method), or the like may be used.

The spacer 827 can be formed using an inorganic insulating material, an organic insulating material, a metal material, or the like. As the inorganic insulating material and the organic insulating material, for example, a variety of materials that can be used for the insulating layer can be used. As the metal material, titanium, aluminum, or the like can be used. When the spacer 827 containing a conductive material and the upper electrode 835 are electrically connected to each other, a potential drop due to the resistance of the upper electrode 835 can be suppressed. The spacer 827 may have either a tapered shape or an inverse tapered shape.

A conductive layer included in the light-emitting panel, which functions as an electrode or a wiring of the transistor, an auxiliary electrode of the light-emitting element, or the like, can be formed to have a single-layer structure or a stacked-layer structure using any of metal materials such as molybdenum, titanium, chromium, tantalum, tungsten, aluminum, copper, neodymium, and scandium, and an alloy material containing any of these elements, for example. Alternatively, the conductive layer may be formed using a conductive metal oxide. As the conductive metal oxide, indium oxide (e.g., $In_2O_3$), tin oxide (e.g., $SnO_2$), zinc oxide (ZnO), ITO, indium zinc oxide (e.g., $In_2O_3$—ZnO), or any of these metal oxide materials in which silicon oxide is contained can be used.

The coloring layer is a colored layer that transmits light in a specific wavelength range. For example, a red (R) color filter for transmitting light in a red wavelength range, a green (G) color filter for transmitting light in a green wavelength range, a blue (B) color filter for transmitting light in a blue wavelength range, or the like can be used. Each coloring layer is formed in a desired position with any of various materials by a printing method, an ink-jet method, an etching method using a photolithography method, or the like.

The light-blocking layer is provided between the adjacent coloring layers. The light-blocking layer blocks light emitted from an adjacent light-emitting element to prevent color mixture between adjacent light-emitting elements. Here, the coloring layer is provided such that its end portion overlaps with the light-blocking layer, whereby light leakage can be suppressed. As the light-blocking layer, a material that can block light from the light-emitting element can be used; for example, a black matrix may be formed using a resin material containing a metal material, pigment, or dye. Note that it is preferable to provide the light-blocking layer in a region other than the light-emitting portion, such as a driver circuit portion, in which case undesired leakage of guided light or the like can be suppressed.

Furthermore, an overcoat covering the coloring layer and the light-blocking layer may be provided. With the overcoat, impurities and the like contained in the coloring layer can be prevented from being diffused into the light-emitting element. The overcoat is formed with a material that transmits light emitted from the light-emitting element; for example, an inorganic insulating film such as a silicon nitride film or a silicon oxide film, an organic insulating film such as an acrylic film or a polyimide film can be used, and a stacked-layer structure of an organic insulating film and an inorganic insulating film may be used.

In the case where upper surfaces of the coloring layer and the light-blocking layer are coated with a material of the sealing layer, a material that has high wettability with respect to the material of the sealing layer is preferably used as the material of the overcoat. For example, an oxide conductive film such as an ITO film or a metal film such as an Ag film that is thin enough to transmit light is preferably used as the overcoat.

For the connector, it is possible to use a paste-like or sheet-like material which is obtained by mixing metal particles into a thermosetting resin and for which anisotropic electric conductivity is provided by thermocompression bonding. As the metal particles, particles in which two or more kinds of metals are layered, for example, nickel particles coated with gold are preferably used. Alternatively, a particulate resin whose surface is coated with a metal is preferably used.

Example of Manufacturing Method

Next, an example of a method for manufacturing a light-emitting panel is described with reference to FIGS. 10A to 10C and FIGS. 11A to 11C. Here, the manufacturing method is described using the light-emitting panel of Specific Example 1 (FIG. 9C) as an example.

Figure 10A:
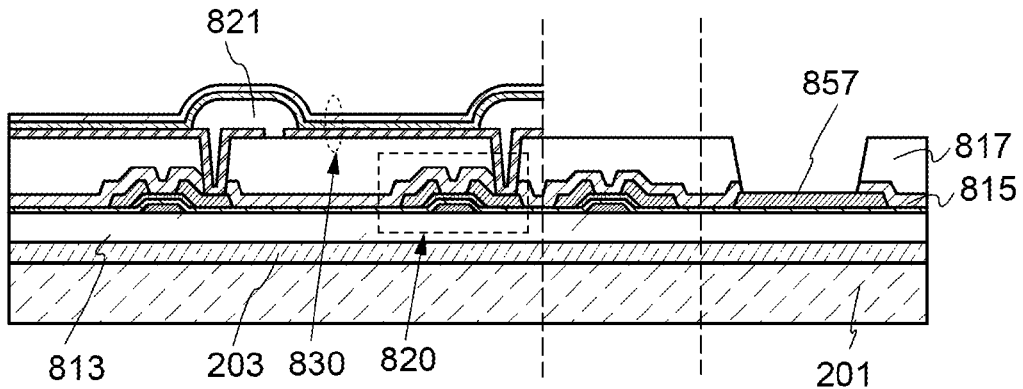
FIGS. 10A to 10C illustrate an example of a method for manufacturing a light-emitting panel of one embodiment.

First, a separation layer 203 is formed over a formation substrate 201, and the insulating layer 813 is formed over the separation layer 203. Next, the plurality of transistors, the conductive layer 857, the insulating layer 815, the insulating layer 817, the plurality of light-emitting elements, and the insulating layer 821 are formed over the insulating layer 813. An opening is formed in the insulating layers 821, 817, and 815 to expose the conductive layer 857 (FIG. 10A).

Figure 10B:
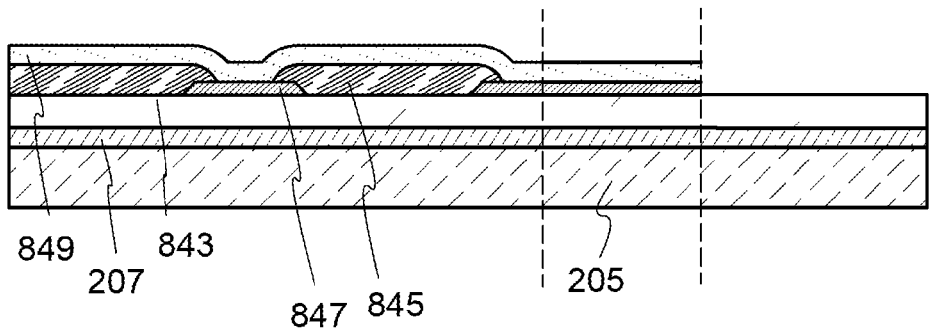

In addition, a separation layer 207 is formed over a formation substrate 205, and the insulating layer 843 is formed over the separation layer 207. Next, the light-blocking layer 847, the coloring layer 845, and the overcoat 849 are formed over the insulating layer 843 (FIG. 10B).

The formation substrate 201 and the formation substrate 205 each can be a glass substrate, a quartz substrate, a sapphire substrate, a ceramic substrate, a metal substrate, or the like.

For the glass substrate, for example, a glass material such as aluminosilicate glass, aluminoborosilicate glass, or barium borosilicate glass can be used. When the temperature of the heat treatment performed later is high, a substrate having a strain point of 730° C. or higher is preferably used as the glass substrate. Note that by containing a large amount of barium oxide (BaO), a glass substrate which is heat-resistant and more practical can be obtained. Alternatively, crystallized glass or the like may be used.

In the case where a glass substrate is used as the formation substrate, an insulating film such as a silicon oxide film, a silicon oxynitride film, a silicon nitride film, or a silicon nitride oxide film is preferably formed between the formation substrate and the separation layer, in which case contamination from the glass substrate can be prevented.

The separation layer 203 and the separation layer 207 each have a single-layer structure or a stacked-layer structure containing an element selected from tungsten, molybdenum, titanium, tantalum, niobium, nickel, cobalt, zirconium, zinc, ruthenium, rhodium, palladium, osmium, iridium, and silicon; an alloy material containing any of the elements; or a compound material containing any of the elements. A crystal structure of a layer containing silicon may be amorphous, microcrystal, or polycrystal.

The separation layer can be formed by a sputtering method, a plasma CVD method, a coating method, a printing method, or the like. Note that a coating method includes a spin coating method, a droplet discharging method, and a dispensing method.

In the case where the separation layer has a single-layer structure, a tungsten layer, a molybdenum layer, or a layer containing a mixture of tungsten and molybdenum is preferably formed. Alternatively, a layer containing an oxide or an oxynitride of tungsten, a layer containing an oxide or an oxynitride of molybdenum, or a layer containing an oxide or an oxynitride of a mixture of tungsten and molybdenum may be formed. Note that a mixture of tungsten and molybdenum is an alloy of tungsten and molybdenum, for example.

In the case where the separation layer is formed to have a stacked-layer structure including a layer containing tungsten and a layer containing an oxide of tungsten, the layer containing an oxide of tungsten may be formed as follows: the layer containing tungsten is formed first and an insulating film formed of an oxide is formed thereover, so that the layer containing an oxide of tungsten is formed at the interface between the tungsten layer and the insulating film. Alternatively, the layer containing an oxide of tungsten may be formed by performing thermal oxidation treatment, oxygen plasma treatment, nitrous oxide ($N_2O$) plasma treatment, treatment with a highly oxidizing solution such as ozone water, or the like on the surface of the layer containing tungsten. Plasma treatment or heat treatment may be performed in an atmosphere of oxygen, nitrogen, or nitrous oxide alone, or a mixed gas of any of these gasses and another gas. Surface condition of the separation layer is changed by the plasma treatment or heat treatment, whereby adhesion between the separation layer and the insulating film formed later can be controlled.

Each of the insulating layers can be formed by a sputtering method, a plasma CVD method, a coating method, a printing method, or the like. For example, the insulating layer is formed at a temperature higher than or equal to 250° C. and lower than or equal to 400° C. by a plasma CVD method, whereby the insulating layer can be a dense film with very low water permeability.

Figure 10C:
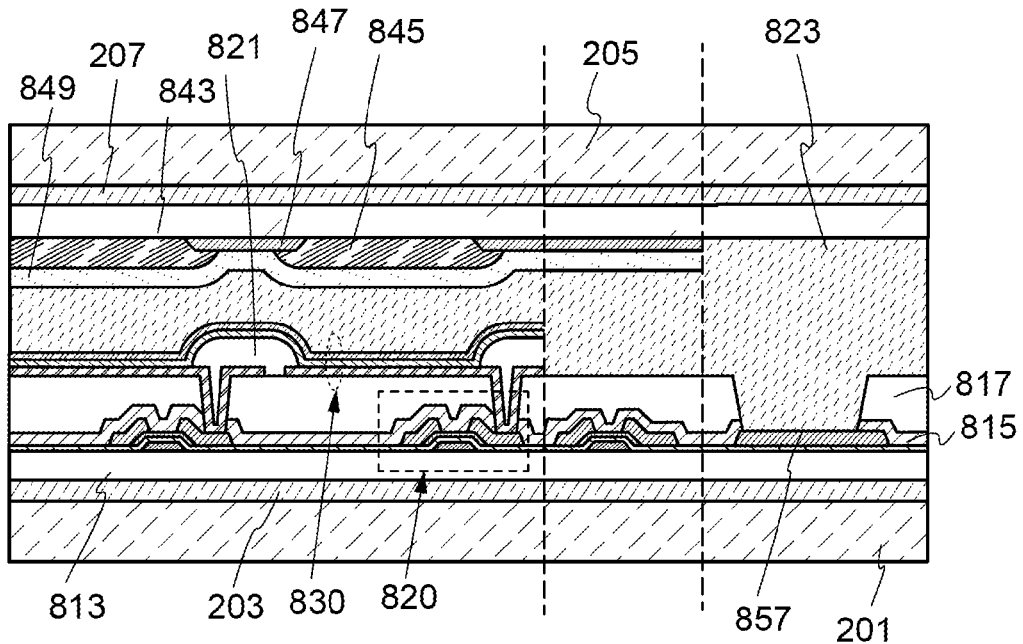

Then, a material for the sealing layer 823 is applied to a surface of the formation substrate 205 over which the coloring layer 845 and the like are formed or a surface of the formation substrate 201 over which the light-emitting element 830 and the like are formed, and the formation substrate 201 and the formation substrate 205 are attached so that these two surfaces face each other with the sealing layer 823 provided therebetween (FIG. 10C).

Next, the formation substrate 201 is separated, and the exposed insulating layer 813 and the substrate 801 are attached to each other with the adhesive layer 811. Furthermore, the formation substrate 205 is separated, and the exposed insulating layer 843 and the substrate 803 are attached to each other with the adhesive layer 841. Although the substrate 803 does not overlap with the conductive layer 857 in FIG. 11A, the substrate 803 may overlap with the conductive layer 857.

Any of a variety of methods can be used as appropriate for the separation process. For example, when a layer including a metal oxide film is formed as the separation layer on the side in contact with the layer to be separated, the metal oxide film is embrittled by crystallization, whereby the layer to be separated can be separated from the formation substrate. Alternatively, when an amorphous silicon film containing hydrogen is formed as the separation layer between a formation substrate having high heat resistance and a layer to be separated, the amorphous silicon film is removed by laser irradiation or etching, whereby the layer to be separated can be separated from the formation substrate. Alternatively, after a layer including a metal oxide film is formed as the separation layer on the side in contact with the layer to be separated, the metal oxide film is embrittled by crystallization, and part of the separation layer is removed by etching using a solution or a fluoride gas such as $NF_3$, $BrF_3$, or $ClF_3$, whereby the separation can be performed at the embrittled metal oxide film. Further alternatively, a method carried out as follows may be employed: a film containing nitrogen, oxygen, hydrogen, or the like (e.g., an amorphous silicon film containing hydrogen, an alloy film containing hydrogen, or an alloy film containing oxygen) is used as the separation layer, and the separation layer is irradiated with laser to release the nitrogen, oxygen, or hydrogen contained in the separation layer as gas, thereby promoting separation between the layer to be separated and the formation substrate. Still further alternatively, it is possible to use a method in which the formation substrate provided with the layer to be separated is removed mechanically or by etching using a solution or a fluoride gas such as $NF_3$, $BrF_3$, or $ClF_3$, or the like. In this case, the separation layer is not necessarily provided.

When a plurality of the above-described separation methods are combined, the separation process can be performed easily. In other words, separation can be performed with physical force (by a machine or the like) after performing laser irradiation, etching on the separation layer with a gas, a solution, or the like, or mechanical removal with a sharp knife, scalpel or the like so that the separation layer and the layer to be separated can be easily separated from each other.

Separation of the layer to be separated from the formation substrate may be performed by soaking the interface between the separation layer and the layer to be separated in a liquid. Furthermore, the separation may be performed while a liquid such as water is being poured.

As another separation method, in the case where the separation layer is formed using tungsten, it is preferable that the separation be performed while etching the separation layer using a mixed solution of ammonium water and a hydrogen peroxide solution.

Note that the separation layer is not necessarily provided in the case where separation at an interface between the formation substrate and the layer to be separated is possible. For example, glass is used as the formation substrate, an organic resin such as polyimide, polyester, polyolefin, polyamide, polycarbonate, or acrylic is formed in contact with the glass, and an insulating film, a transistor, and the like are formed over the organic resin. In this case, heating the organic resin enables the separation at the interface between the formation substrate and the organic resin. Alternatively, separation at the interface between a metal layer and the organic resin may be performed in the following manner: the metal layer is provided between the formation substrate and the organic resin and current is made to flow in the metal layer so that the metal layer is heated.

Figure 11A:
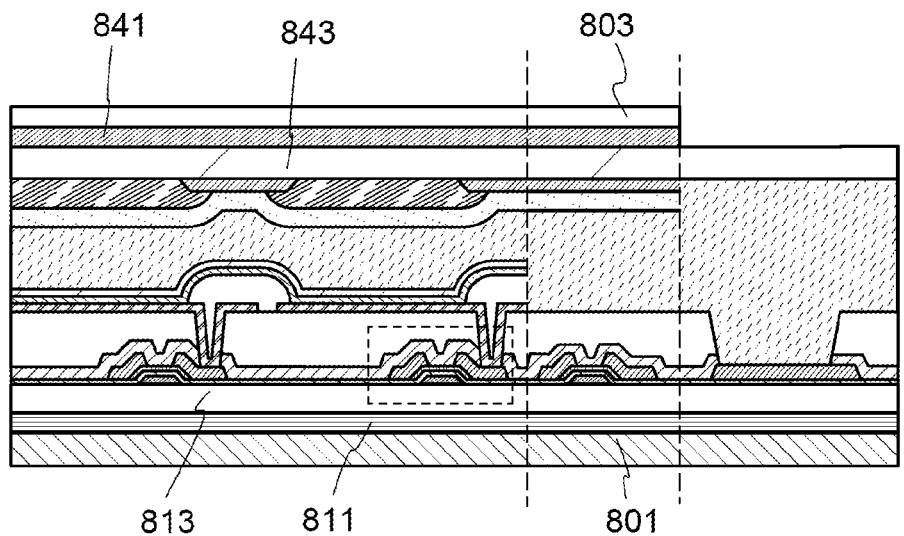
FIGS. 11A to 11C illustrate an example of a method for manufacturing a light-emitting panel of one embodiment.
Figure 11B:
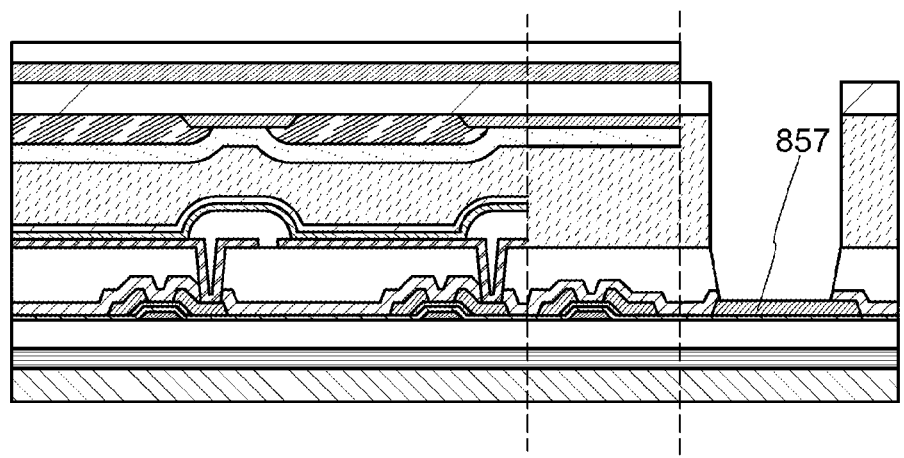
Figure 11C:
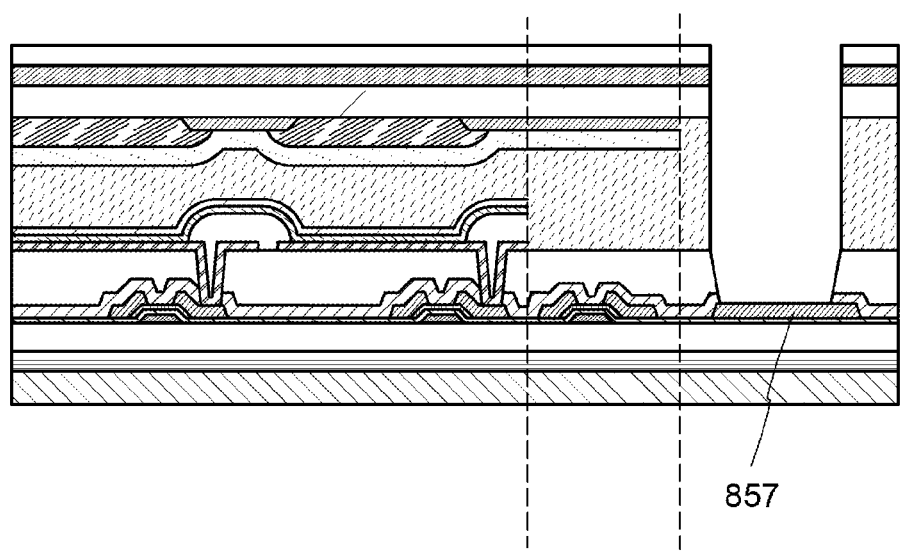

Lastly, an opening is formed in the insulating layer 843 and the sealing layer 823 to expose the conductive layer 857 (FIG. 11B). In the case where the substrate 803 overlaps with the conductive layer 857, an opening is formed also in the substrate 803 and the adhesive layer 841 so that the conductive layer 857 is exposed (FIG. 11C). There is no particular limitation on the method for forming the opening. For example, a laser ablation method, an etching method, an ion beam sputtering method, or the like may be used. As another method, a cut may be made in a film over the conductive layer 857 with a sharp knife or the like and part of the film may be separated by physical force.

In the above-described manner, the light-emitting panel can be manufactured.

At least part of this embodiment can be implemented as appropriate in combination with any of the other embodiments described in this specification.

Embodiment 3

In this embodiment, structure examples of a foldable touch panel that is applicable to a display panel included in the electronic device of one embodiment of the present invention will be described with reference to FIGS. 12A to 12C, FIGS. 13A and 13B, FIGS. 14A to 14C, and FIGS. 15A to 15C. Note that for a material of each layer, refer to Embodiment 2.

Structure Example 1

Figure 12A:
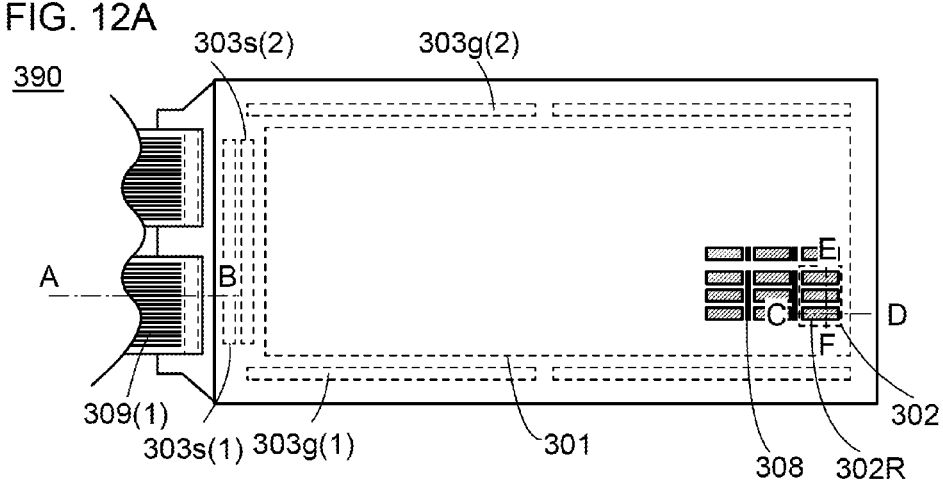
FIGS. 12A to 12C illustrate an example of a touch panel of one embodiment.
Figure 12B:
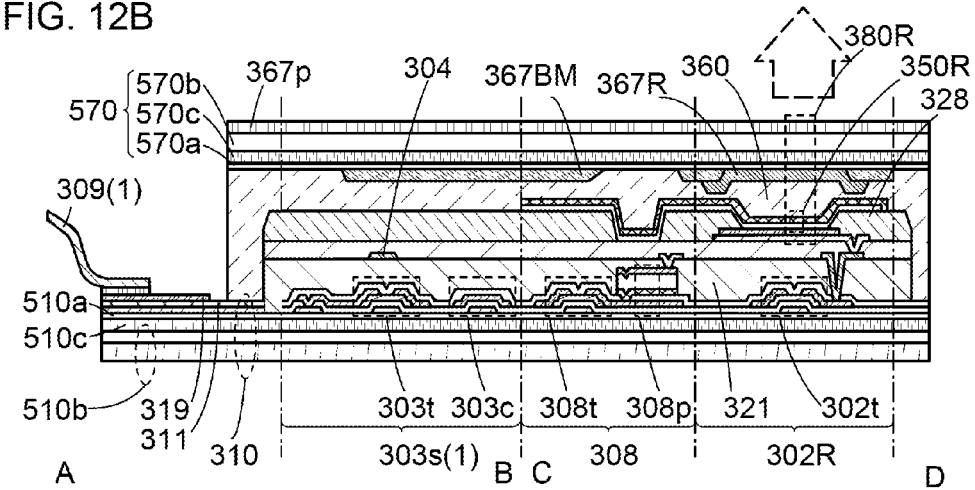
Figure 12C:
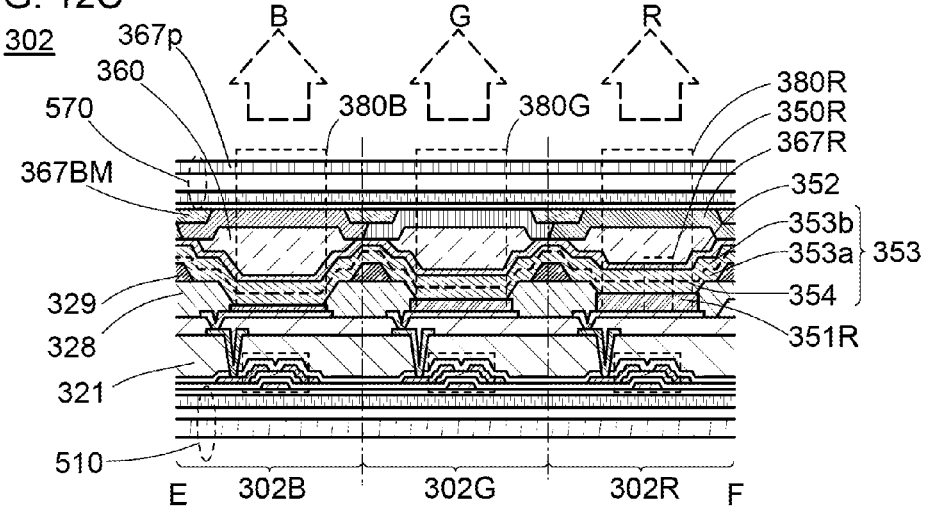

FIG. 12A is a top view of the touch panel. FIG. 12B is a cross-sectional view taken along dashed-dotted line A-B and dashed-dotted line C-D in FIG. 12A. FIG. 12C is a cross-sectional view taken along dashed-dotted line E-F in FIG. 12A.

As illustrated in FIG. 12A, a touch panel 390 includes a display portion 301.

The display portion 301 includes a plurality of pixels 302 and a plurality of imaging pixels 308. The imaging pixels 308 can sense a touch of a finger or the like on the display portion 301. Thus, a touch sensor can be formed using the imaging pixels 308.

Each of the pixels 302 includes a plurality of sub-pixels (e.g., a sub-pixel 302R). In addition, in the sub-pixels, light-emitting elements and pixel circuits that can supply electric power for driving the light-emitting elements are provided.

The pixel circuits are electrically connected to wirings through which selection signals are supplied and wirings through which image signals are supplied.

Furthermore, the touch panel 390 is provided with a scan line driver circuit 303g(1) that can supply selection signals to the pixels 302 and an image signal line driver circuit 303s(1) that can supply image signals to the pixels 302.

The imaging pixels 308 include photoelectric conversion elements and imaging pixel circuits that drive the photoelectric conversion elements.

The imaging pixel circuits are electrically connected to wirings through which control signals are supplied and wirings through which power supply potentials are supplied.

Examples of the control signals include a signal for selecting an imaging pixel circuit from which a recorded imaging signal is read, a signal for initializing an imaging pixel circuit, and a signal for determining the time it takes for an imaging pixel circuit to detect light.

The touch panel 390 is provided with an imaging pixel driver circuit 303g(2) that can supply control signals to the imaging pixels 308 and an imaging signal line driver circuit 303s(2) that reads out imaging signals.

As illustrated in FIG. 12B, the touch panel 390 includes a substrate 510 and a substrate 570 that faces the substrate 510.

Flexible materials can be favorably used for the substrate 510 and the substrate 570.

Materials with which passage of impurities is inhibited can be favorably used for the substrate 510 and the substrate 570. For example, materials with a vapor permeability of lower than or equal to $10^{-5}$ g/m$^2$·day, preferably lower than or equal to $10^{-6}$ g/m$^2$·day can be favorably used.

The substrate 510 can be favorably formed using a material whose coefficient of linear expansion is substantially equal to that of the substrate 570. For example, the coefficient of linear expansion of the materials are preferably lower than or equal to $1\times10^{-3}$ 1K, further preferably lower than or equal to $5\times10^{-5}$/K, and still further preferably lower than or equal to $1\times10^{-5}$/K.

The substrate 510 is a stacked body including a flexible substrate 510b, an insulating layer 510a that prevents diffusion of impurities to the light-emitting elements, and an adhesive layer 510c that bonds the insulating layer 510a to the flexible substrate 510b.

The substrate 570 is a stacked body including a flexible substrate 570*b*, an insulating layer 570*a* that prevents diffusion of impurities to the light-emitting elements, and an adhesive layer 570*c* that bonds the insulating layer 570*a* to the flexible substrate 570*b*.

For example, materials that include polyester, polyolefin, polyamide (e.g., nylon, aramid), polyimide, polycarbonate, or a resin having an acrylic bond, a urethane bond, an epoxy bond, or a siloxane bond can be used for the adhesive layer.

A sealing layer 360 bonds the substrate 570 to the substrate 510. The sealing layer 360 has a refractive index higher than that of air. In the case where light is extracted through the sealing layer 360, the sealing layer 360 also serves as a layer (hereinafter, also referred to as an optical bonding layer) that optically bonds two components (here, the substrates 510 and 570) between which the sealing layer 360 is sandwiched. The pixel circuits and the light-emitting elements (e.g., a light-emitting element 350R) are provided between the substrate 510 and the substrate 570.

Each of the pixels 302 includes the sub-pixel 302R, a sub-pixel 302G, and a sub-pixel 302B (FIG. 12C). The sub-pixel 302R includes a light-emitting module 380R, the sub-pixel 302G includes a light-emitting module 380G, and the sub-pixel 302B includes a light-emitting module 380B.

For example, the sub-pixel 302R includes the first light-emitting element 350R and the pixel circuit that can supply electric power to the first light-emitting element 350R and includes a transistor 302*t* (FIG. 12B). Furthermore, the light-emitting module 380R includes the first light-emitting element 350R and an optical element (e.g., a coloring layer 367R).

The first light-emitting element 350R includes a first lower electrode 351R, an upper electrode 352, and an EL layer 353 between the first lower electrode 351R and the upper electrode 352 (FIG. 12C).

The EL layer 353 includes a first EL layer 353*a*, a second EL layer 353*b*, and an intermediate layer 354 between the first EL layer 353*a* and the second EL layer 353*b*.

The light-emitting module 380R includes the first coloring layer 367R on the substrate 570. The coloring layer transmits light of a particular wavelength and is, for example, a layer that selectively transmits light of red, green, or blue color. Note that a region that transmits light emitted from the light-emitting element as it is may be provided as well.

The light-emitting module 380R, for example, includes the sealing layer 360 that is in contact with the first light-emitting element 350R and the first coloring layer 367R.

The first coloring layer 367R is positioned in a region overlapping with the first light-emitting element 350R. Accordingly, part of light emitted from the first light-emitting element 350R passes through the sealing layer 360 that also serves as an optical bonding layer and through the first coloring layer 367R and is emitted to the outside of the light-emitting module 380R as indicated by arrows in FIGS. 12B and 12C.

The touch panel 390 includes a light-blocking layer 367BM on the substrate 570. The light-blocking layer 367BM is provided so as to surround the coloring layer (e.g., the first coloring layer 367R).

The touch panel 390 includes an anti-reflective layer 367*p* positioned in a region overlapping with the display portion 301. As the anti-reflective layer 367*p*, a circular polarizing plate can be used, for example.

The touch panel 390 includes an insulating layer 321. The insulating layer 321 covers the transistor 302*t*. Note that the insulating layer 321 can be used as a layer for planarizing unevenness caused by the pixel circuits. An insulating film on which a layer that can prevent diffusion of impurities to the transistor 302*t* and the like is stacked can be used as the insulating layer 321.

The touch panel 390 includes the light-emitting elements (e.g., the first light-emitting element 350R) over the insulating layer 321.

The touch panel 390 includes, over the insulating layer 321, a partition 328 that overlaps with an end portion of the first lower electrode 351R. In addition, a spacer 329 that controls the distance between the substrate 510 and the substrate 570 is provided on the partition 328.

The image signal line driver circuit 303*s*(1) includes a transistor 303*t* and a capacitor 303*c*. Note that the driver circuit and the pixel circuits can be formed in the same process over the same substrate. As illustrated in FIG. 12B, the transistor 303*t* may include a second gate 304 over the insulating layer 321. The second gate 304 may be electrically connected to a gate of the transistor 303*t*. Alternatively, different potentials may be supplied to the second gate 304 and the gate of the transistor 303*t*. The second gate 304 may be provided in a transistor 308*t*, the transistor 302*t*, or the like if necessary.

The imaging pixels 308 each include a photoelectric conversion element 308*p* and an imaging pixel circuit for sensing light received by the photoelectric conversion element 308*p*. The imaging pixel circuit includes the transistor 308*t*.

For example, a PIN photodiode can be used as the photoelectric conversion element 308*p*.

The touch panel 390 includes a wiring 311 through which a signal can be supplied. The wiring 311 is provided with a terminal 319. Note that an FPC 309(1) through which a signal such as an image signal or a synchronization signal can be supplied is electrically connected to the terminal 319. Note that a printed wiring board (PWB) may be attached to the FPC 309(1).

Transistors formed in the same process can be used as the transistor 302*t*, the transistor 303*t*, the transistor 308*t*, and the like. Embodiment 2 can be referred to for the structures of the transistors.

As a gate, source, and drain of a transistor, and a wiring or an electrode included in a touch panel, a single-layer structure or a stacked-layer structure using any of metals such as aluminum, titanium, chromium, nickel, copper, yttrium, zirconium, molybdenum, silver, tantalum, and tungsten, or an alloy containing any of these metals as its main component can be used. For example, a single-layer structure of an aluminum film containing silicon, a two-layer structure in which an aluminum film is stacked over a titanium film, a two-layer structure in which an aluminum film is stacked over a tungsten film, a two-layer structure in which a copper film is stacked over a copper-magnesium-aluminum alloy film, a two-layer structure in which a copper film is stacked over a titanium film, a two-layer structure in which a copper film is stacked over a tungsten film, a three-layer structure in which a titanium film or a titanium nitride film, an aluminum film or a copper film, and a titanium film or a titanium nitride film are stacked in this order, a three-layer structure in which a molybdenum film or a molybdenum nitride film, an aluminum film or a copper film, and a molybdenum film or a molybdenum nitride film are stacked in this order, and the like can be given. Note that a transparent conductive material containing indium oxide, tin oxide, or zinc oxide may be used. Copper containing manganese is preferably used because controllability of a shape by etching is increased.

Structure Example 2

Figure 13A:
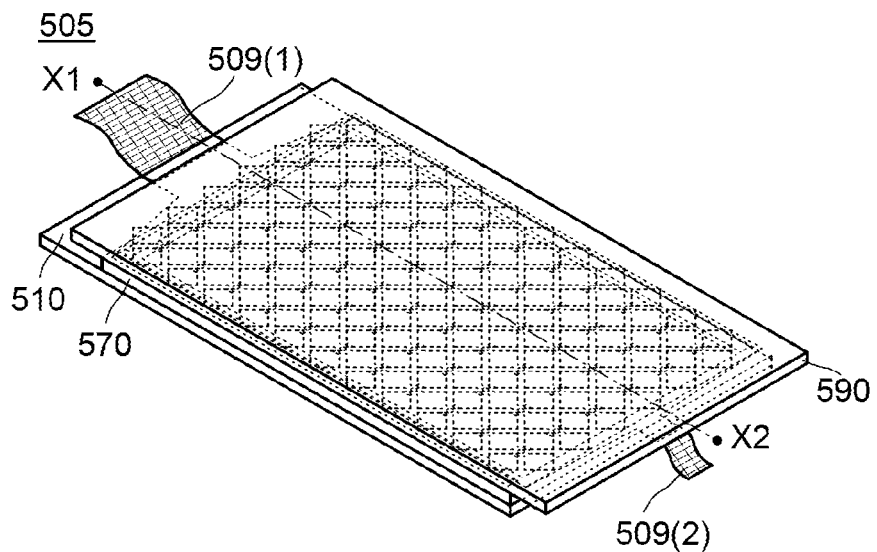
FIGS. 13A and 13B illustrate an example of a touch panel of one embodiment.
Figure 13B:
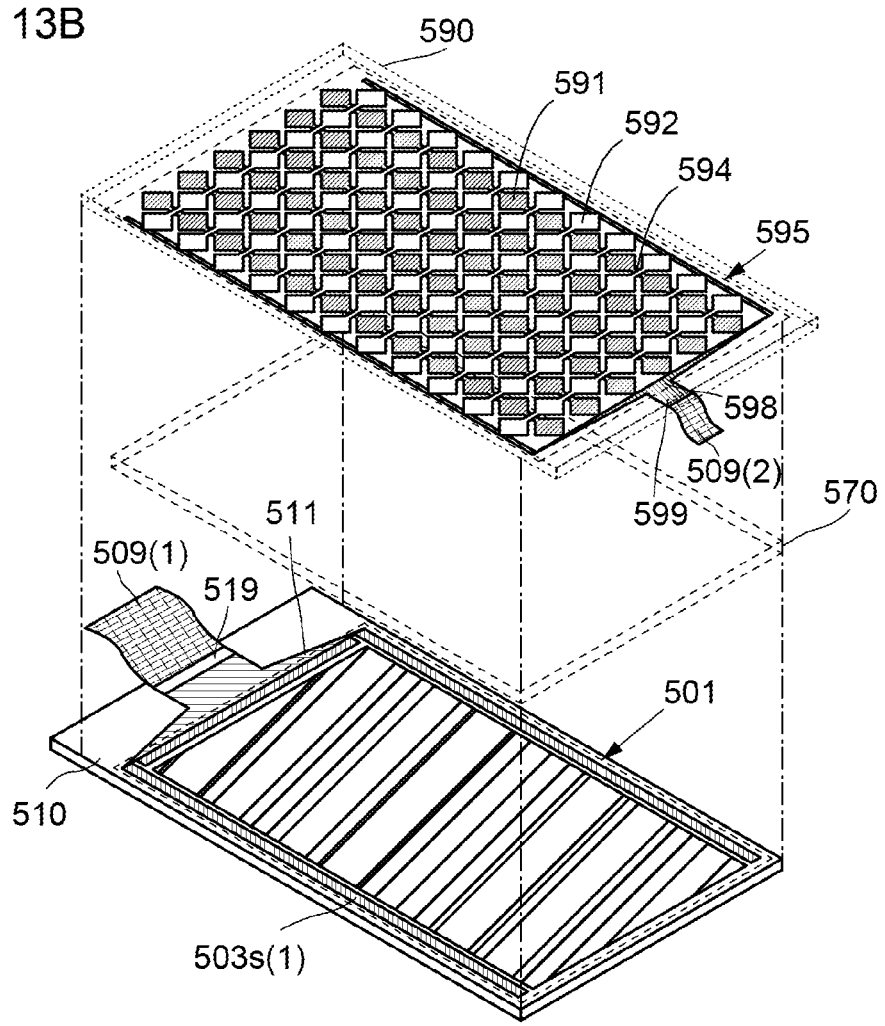
Figure 14A:
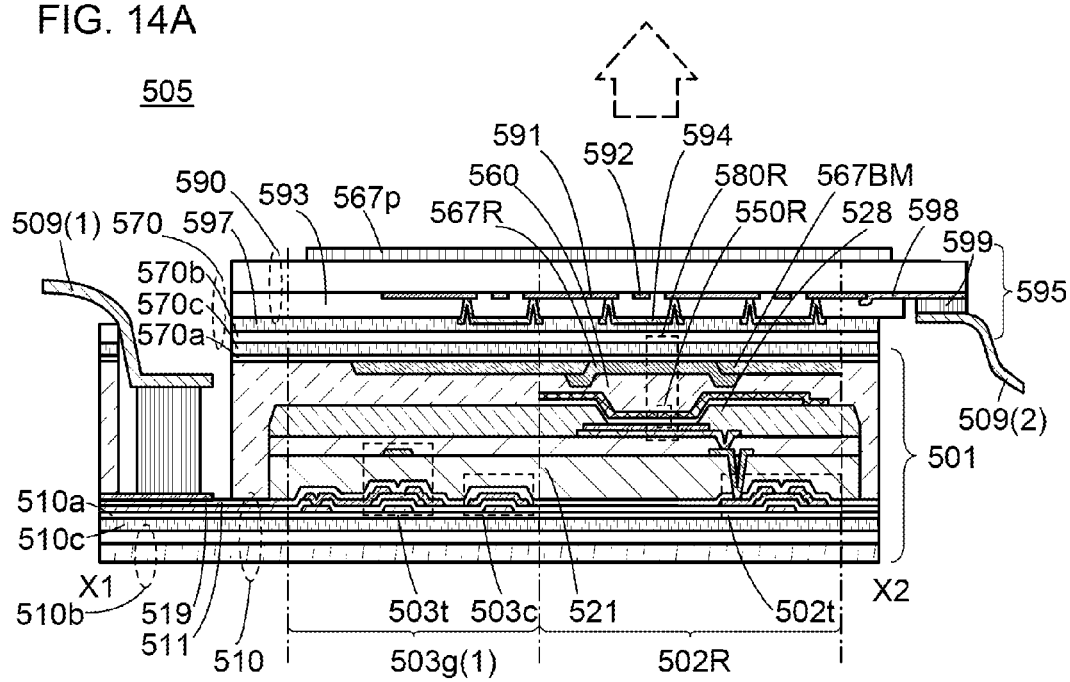
FIGS. 14A to 14C illustrate examples of a touch panel of one embodiment.
Figure 14B:
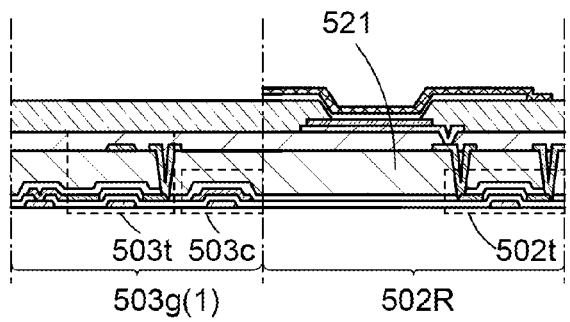
Figure 14C:
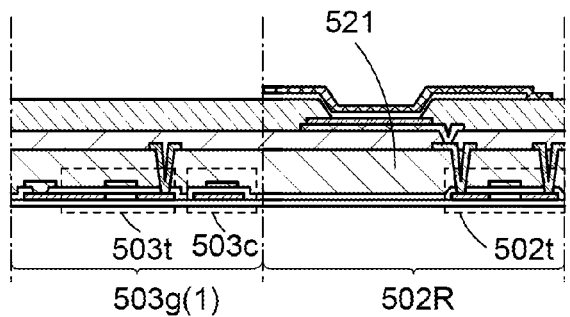

FIGS. 13A and 13B are perspective views of a touch panel 505. For simplicity, only main components are illustrated. FIGS. 14A to 14C are cross-sectional views along dashed-dotted line X1-X2 in FIG. 13A.

The touch panel 505 includes a display portion 501 and a touch sensor 595 (FIG. 13B). Furthermore, the touch panel 505 includes the substrate 510, the substrate 570, and a substrate 590. Note that the substrate 510, the substrate 570, and the substrate 590 each have flexibility.

The display portion 501 includes the substrate 510, a plurality of pixels over the substrate 510, and a plurality of wirings 511 through which signals are supplied to the pixels. The plurality of wirings 511 are led to a peripheral portion of the substrate 510, and part of the plurality of wirings 511 form a terminal 519. The terminal 519 is electrically connected to an FPC 509(1).

The substrate 590 includes the touch sensor 595 and a plurality of wirings 598 electrically connected to the touch sensor 595. The plurality of wirings 598 are led to a peripheral portion of the substrate 590, and part of the plurality of wirings 598 form a terminal. The terminal is electrically connected to an FPC 509(2). Note that in FIG. 13B, electrodes, wirings, and the like of the touch sensor 595 provided on the back side of the substrate 590 (on the substrate 510 side) are indicated by solid lines for clarity.

As the touch sensor 595, a capacitive touch sensor can be used. Examples of the capacitive touch sensor are a surface capacitive touch sensor and a projected capacitive touch sensor.

Examples of the projected capacitive touch sensor are a self-capacitive touch sensor and a mutual capacitive touch sensor, which differ mainly in the driving method. The use of a mutual capacitive touch sensor is preferable because multiple points can be sensed simultaneously.

An example of using a projected capacitive touch sensor will be described below with reference to FIG. 13B.

Note that a variety of sensors that can sense the closeness or the contact of an object such as a finger can be used.

The projected capacitive touch sensor 595 includes electrodes 591 and electrodes 592. The electrodes 591 are electrically connected to any of the plurality of wirings 598, and the electrodes 592 are electrically connected to any of the other wirings 598.

The electrodes 592 each have a shape of a plurality of quadrangles arranged in one direction with one corner of a quadrangle connected to one corner of another quadrangle as illustrated in FIGS. 13A and 13B.

The electrodes 591 each have a quadrangular shape and are arranged in a direction intersecting with the direction in which the electrodes 592 extend.

A wiring 594 electrically connects two electrodes 591 between which one electrode 592 is positioned. The intersecting area of the electrode 592 and the wiring 594 is preferably as small as possible. Such a structure allows a reduction in the area of a region where the electrodes are not provided, reducing unevenness in transmittance. As a result, unevenness in luminance of light from the touch sensor 595 can be reduced.

Note that the shapes of the electrodes 591 and the electrodes 592 are not limited to the above-mentioned shapes and can be any of a variety of shapes. For example, the plurality of electrodes 591 may be provided so that space between the electrodes 591 are reduced as much as possible, and a plurality of electrodes 592 may be provided with an insulating layer sandwiched between the electrodes 591 and the electrodes 592 and may be spaced apart from each other to form a region not overlapping with the electrodes 591. In that case, between two adjacent electrodes 592, a dummy electrode that is electrically insulated from these electrodes is preferably provided, whereby the area of a region having a different transmittance can be reduced.

The touch sensor 595 includes the substrate 590, the electrodes 591 and the electrodes 592 provided in a staggered arrangement on the substrate 590, an insulating layer 593 covering the electrodes 591 and the electrodes 592, and the wiring 594 that electrically connects the adjacent electrodes 591 to each other.

An adhesive layer 597 bonds the substrate 590 to the substrate 570 so that the touch sensor 595 overlaps with the display portion 501.

The electrodes 591 and the electrodes 592 are formed using a light-transmitting conductive material. As the light-transmitting conductive material, a conductive oxide such as indium oxide, indium tin oxide, indium zinc oxide, zinc oxide, or zinc oxide to which gallium is added can be used. Note that a film including graphene may be used as well. The film containing graphene can be formed, for example, by reducing a film containing graphene oxide. As a reducing method, a method with application of heat or the like can be employed.

Note that, for example, a low-resistance material is preferably used as a material of conductive films such as the electrode 591 and the electrode 592, i.e., a wiring and an electrode in the touch panel. For example, silver, copper, aluminum, a carbon nanotube, graphene, a metal halide (e.g., a silver halide), or the like may be used. Alternatively, a metal nanowire including a number of conductors with an extremely small width (for example, a diameter of several nanometers) may be used. Further alternatively, a net-like metal mesh with a conductor may be used. For example, an Ag nanowire, a Cu nanowire, an Al nanowire, an Ag mesh, a Cu mesh, or an Al mesh may be used. In the case of using an Ag nanowire, light transmittance of 89% or more and a sheet resistance of 40 ohm/square or more and 100 ohm/square or less can be achieved. Note that because of having high transmittance, a metal nanowire, a metal mesh, a carbon nanotube, graphene, or the like may be used as an electrode of the display element, such as a pixel electrode or a common electrode.

The electrodes 591 and the electrodes 592 may be formed by depositing a light-transmitting conductive material on the substrate 590 by a sputtering method and then removing an unnecessary portion by any of various patterning techniques such as photolithography.

Examples of a material for the insulating layer 593 are a resin such as acrylic or epoxy resin, a resin having a siloxane bond, and an inorganic insulating material such as silicon oxide, silicon oxynitride, or aluminum oxide.

Furthermore, openings reaching the electrodes 591 are formed in the insulating layer 593, and the wiring 594 electrically connects the adjacent electrodes 591. A light-transmitting conductive material can be favorably used as the wiring 594 because the aperture ratio of the touch panel can be increased. Moreover, a material with higher conductivity than the conductivities of the electrodes 591 and the electrodes 592 can be favorably used for the wiring 594 because electric resistance can be reduced.

One of the electrodes 592 extends in one direction, and a plurality of electrodes 592 are provided in the form of stripes.

The wiring 594 intersects with the electrodes 592.

Adjacent electrodes 591 are provided with one of the electrodes 592 provided therebetween. The wiring 594 electrically connects the adjacent electrodes 591.

Note that the plurality of electrodes 591 is not necessarily arranged in the direction orthogonal to one electrode 592 and may be arranged to intersect with one electrode 592 at an angle of less than 90°.

One wiring 598 is electrically connected to any of the electrodes 591 and the electrodes 592. Part of the wiring 598 serves as a terminal. For the wiring 598, a metal material such as aluminum, gold, platinum, silver, nickel, titanium, tungsten, chromium, molybdenum, iron, cobalt, copper, or palladium or an alloy material containing any of these metal materials can be used.

Note that an insulating layer that covers the insulating layer 593 and the wiring 594 may be provided to protect the touch sensor 595.

Furthermore, a connection layer 599 electrically connects the wiring 598 to the FPC 509(2).

As the connection layer 599, any of various anisotropic conductive films (ACF), anisotropic conductive pastes (ACP), and the like can be used.

The adhesive layer 597 has a light-transmitting property. For example, a thermosetting resin or an ultraviolet curable resin can be used; specifically, a resin such as an acrylic resin, a urethane resin, an epoxy resin, or a resin having a siloxane bond can be used.

The display portion 501 includes a plurality of pixels arranged in a matrix. Each of the pixels includes a display element and a pixel circuit for driving the display element.

In this embodiment, an example of using an organic EL element that emits white light as a display element will be described; however, the display element is not limited to such element.

For example, organic EL elements that emit light of different colors may be included in sub-pixels so that the light of different colors can be emitted from the respective sub-pixels.

The substrate 510, the substrate 570, and a sealing layer 560 can have structures similar to those in Structure Example 1.

A pixel includes a sub-pixel 502R, and the sub-pixel 502R includes a light-emitting module 580R.

The sub-pixel 502R includes a first light-emitting element 550R and a pixel circuit including a transistor 502t that can supply electric power to the first light-emitting element 550R. Furthermore, the light-emitting module 580R includes the first light-emitting element 550R and an optical element (e.g., a coloring layer 567R).

The first light-emitting element 550R includes a lower electrode, an upper electrode, and an EL layer between the lower electrode and the upper electrode.

The light-emitting module 580R includes the first coloring layer 567R on the light extraction side.

In the case where the sealing layer 560 is provided on the light extraction side, the sealing layer 560 is in contact with the first light-emitting element 550R and the first coloring layer 567R.

The first coloring layer 567R is positioned in a region overlapping with the first light-emitting element 550R. Accordingly, part of light emitted from the first light-emitting element 550R passes through the first coloring layer 567R and is emitted to the outside of the light-emitting module 580R as indicated by an arrow in FIG. 14A.

The display portion 501 includes a light-blocking layer 567BM on the light extraction side. The light-blocking layer 567BM is provided so as to surround the coloring layer (e.g., the first coloring layer 567R).

The display portion 501 includes an anti-reflective layer 567p positioned in a region overlapping with pixels. As the anti-reflective layer 567p, a circular polarizing plate can be used, for example.

The display portion 501 includes an insulating film 521. The insulating film 521 covers the transistor 502t. Note that the insulating film 521 can be used as a layer for planarizing unevenness caused by the pixel circuits. A stacked film including a layer that can prevent diffusion of impurities can be used as the insulating film 521. This can prevent the reliability of the transistor 502t or the like from being lowered by diffusion of impurities.

The display portion 501 includes the light-emitting elements (e.g., the first light-emitting element 550R) over the insulating film 521.

The display portion 501 includes, over the insulating film 521, a partition 528 that overlaps with an end portion of a first lower electrode. In addition, a spacer that controls the distance between the substrate 510 and the substrate 570 is provided on the partition 528.

A scan line driver circuit 503g(1) includes a transistor 503t and a capacitor 503c. Note that the driver circuit and the pixel circuits can be formed in the same process over the same substrate.

The display portion 501 includes the wirings 511 through which signals can be supplied. The wirings 511 are provided with the terminal 519. Note that the FPC 509(1) through which a signal such as an image signal or a synchronization signal can be supplied is electrically connected to the terminal 519.

Note that a printed wiring board (PWB) may be attached to the FPC 509(1).

The display portion 501 includes wirings such as scan lines, signal lines, and power supply lines. Any of various conductive films described the above can be used as the wirings.

Note that any of various kinds of transistors can be used in the display portion 501. A structure in the case of using bottom-gate transistors in the display portion 501 is illustrated in FIGS. 14A and 14B.

For example, a semiconductor layer containing an oxide semiconductor, amorphous silicon, or the like can be used in the transistor 502t and the transistor 503t illustrated in FIG. 14A.

For example, a semiconductor layer containing polycrystalline silicon that is obtained by crystallization process such as laser annealing can be used in the transistor 502t and the transistor 503t illustrated in FIG. 14B.

A structure in the case of using top-gate transistors in the display portion 501 is illustrated in FIG. 14C.

For example, a semiconductor layer containing polycrystalline silicon, a transferred single crystal silicon film, or the like can be used in the transistor 502t and the transistor 503t illustrated in FIG. 14C.

Structural Example 3

Figure 15A:
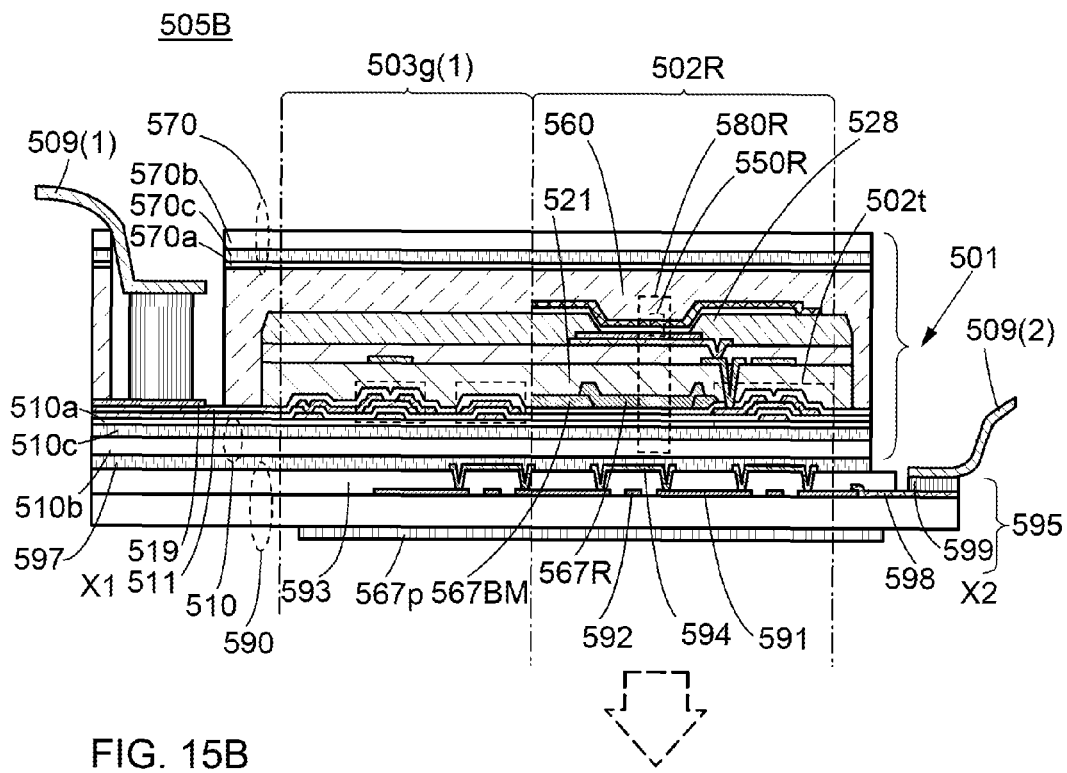
FIGS. 15A to 15C illustrate examples of a touch panel of one embodiment.
Figure 15B:
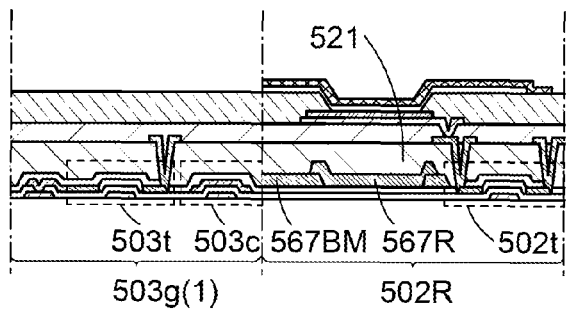
Figure 15C:
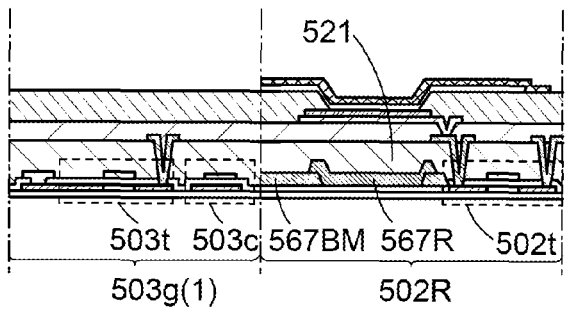

FIGS. 15A to 15C are cross-sectional views of a touch panel 505B. The touch panel 505B described in this embodiment is different from the touch panel 505 described in Structural Example 2 in that the display portion 501 displays received image data to the side where the transistors are provided and that the touch sensor is provided on the substrate 510 side of the display portion. Different structures will be described in detail below, and the above description is referred to for the other similar structures.

The first coloring layer 567R is positioned in a region overlapping with the first light-emitting element 550R. The light-emitting element 550R illustrated in FIG. 15A emits light to the side where the transistor 502t is provided. Accordingly, part of light emitted from the light-emitting element 550R passes through the first coloring layer 567R and is emitted to the outside of the light-emitting module 580R as indicated by an arrow in FIG. 15A.

The display portion 501 includes the light-blocking layer 567BM on the light extraction side. The light-blocking layer 567BM is provided so as to surround the coloring layer (e.g., the first coloring layer 567R).

The touch sensor 595 is provided on the substrate 510 side of the display portion 501 (FIG. 15A).

The adhesive layer 597 is provided between the substrate 510 and the substrate 590 and attaches the touch sensor 595 to the display portion 501.

Any of various kinds of transistors can be used in the display portion 501. A structure in the case of using bottom-gate transistors in the display portion 501 is illustrated in FIGS. 15A and 15B.

For example, a semiconductor layer containing an oxide semiconductor, amorphous silicon, or the like can be used in the transistor 502t and the transistor 503t illustrated in FIG. 15A.

For example, a semiconductor layer containing polycrystalline silicon or the like can be used in the transistor 502t and the transistor 503t illustrated in FIG. 15B.

A structure in the case of using top-gate transistors in the display portion 501 is illustrated in FIG. 15C.

For example, a semiconductor layer containing polycrystalline silicon, a transferred single crystal silicon film, or the like can be used in the transistor 502t and the transistor 503t illustrated in FIG. 15C.

At least part of this embodiment can be implemented in combination with any of the embodiments described in this specification as appropriate.

Embodiment 4

In this embodiment, an example of a method for driving a touch panel that can be used for a display panel included in the display device of one embodiment of the present invention will be described with reference to drawings.

Example of Detection Method of Sensor

Figure 16A:
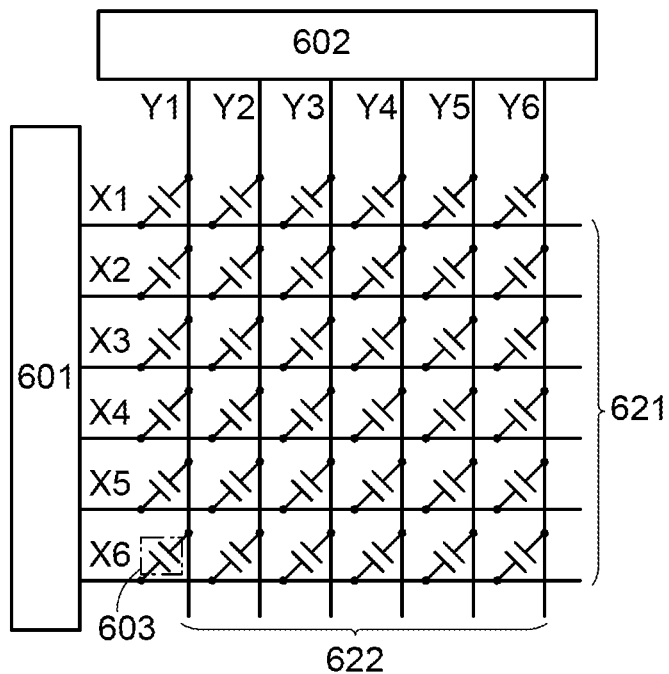
FIGS. 16A and 16B are a block diagram and a timing chart of a touch sensor.

FIG. 16A is a block diagram illustrating the structure of a mutual capacitive touch sensor. FIG. 16A illustrates a pulse voltage output circuit 601 and a current sensing circuit 602. Note that in FIG. 16A, six wirings X1 to X6 represent the electrodes 621 to which a pulse voltage is applied, and six wirings Y1 to Y6 represent the electrodes 622 that detect changes in current. FIG. 16A also illustrates a capacitor 603 that is formed where the electrodes 621 and 622 overlap with each other. Note that functional replacement between the electrodes 621 and 622 is possible.

The pulse voltage output circuit 601 is a circuit for sequentially applying a pulse voltage to the wirings X1 to X6. By application of a pulse voltage to the wirings X1 to X6, an electric field is generated between the electrodes 621 and 622 of the capacitor 603. When the electric field between the electrodes is shielded, for example, a change occurs in the capacitor 603 (mutual capacitance). The approach or contact of an object can be sensed by utilizing this change.

The current sensing circuit 602 is a circuit for detecting changes in current flowing through the wirings Y1 to Y6 that are caused by the change in mutual capacitance in the capacitor 603. No change in current value is detected in the wirings Y1 to Y6 when there is no approach or contact of an object, whereas a decrease in current value is detected when mutual capacitance is decreased owing to the approach or contact of an object. Note that an integrator circuit or the like is used for detection of current values.

Figure 16B:
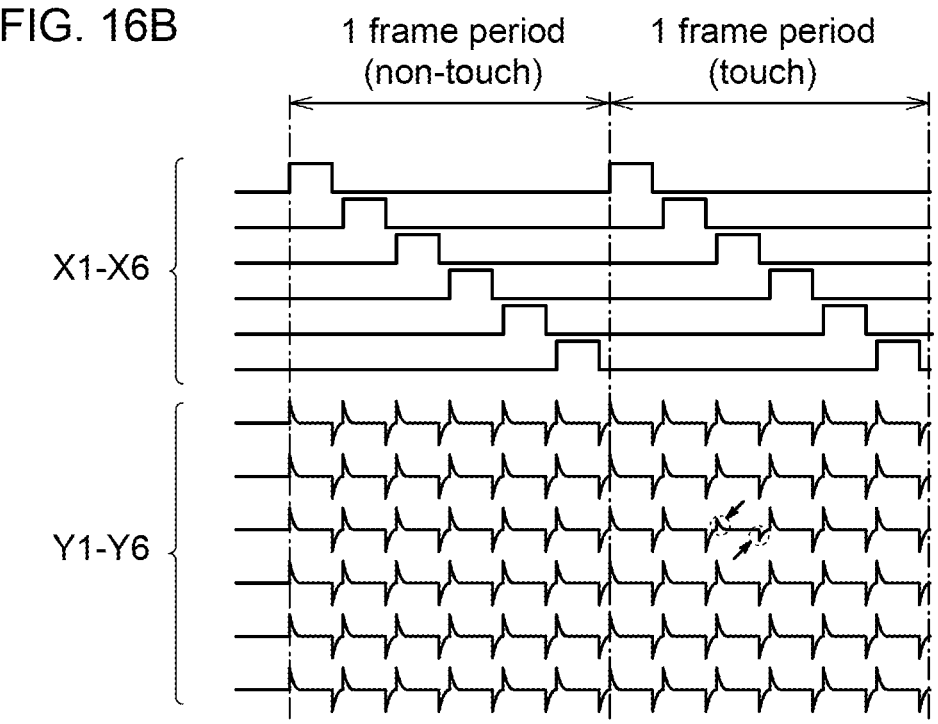

FIG. 16B is a timing chart showing input and output waveforms in the mutual capacitive touch sensor illustrated in FIG. 16A. In FIG. 16B, sensing of an object is performed in all the rows and columns in one frame period. FIG. 16B shows a period when an object is not sensed (not touched) and a period when an object is sensed (touched). Sensed current values of the wirings Y1 to Y6 are shown as waveforms of voltage values.

Pulse voltage is sequentially applied to the wirings X1 to X6, and waveforms of the wirings Y1 to Y6 change in accordance with the pulse voltage. When there is no proximity or contact of an object, the waveforms of the wirings Y1 to Y6 change in accordance with changes in the voltages of the wirings X1 to X6. The current value is decreased at the point of approach or contact of the object and accordingly the waveform of the voltage value changes.

By detecting a change in mutual capacitance in this manner, proximity or contact of an object can be sensed.

Figure 17:
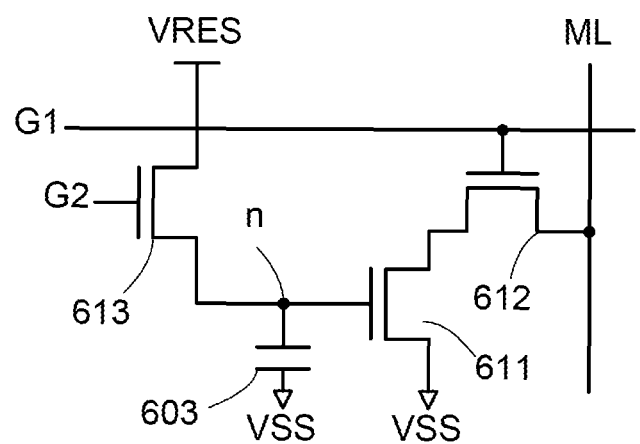
FIG. 17 is a circuit diagram of a touch sensor.

Although FIG. 16A is a passive matrix type touch sensor in which only the capacitor 603 is provided at the intersection of wirings as a touch sensor, an active matrix type touch sensor including a transistor and a capacitor may be used. FIG. 17 is a sensor circuit included in an active matrix type touch sensor.

The sensor circuit includes the capacitor 603 and transistors 611, 612, and 613. A signal G2 is input to a gate of the transistor 613. A voltage VRES is applied to one of a source and a drain of the transistor 613, and one electrode of the capacitor 603 and a gate of the transistor 611 are electrically connected to the other of the source and the drain of the transistor 613. One of a source and a drain of the transistor 611 is electrically connected to one of a source and a drain of the transistor 612, and a voltage VSS is applied to the other of the source and the drain of the transistor 611. A signal G1 is input to a gate of the transistor 612, and a wiring ML is electrically connected to the other of the source and the drain of the transistor 612. The voltage VSS is applied to the other electrode of the capacitor 603.

Next, the operation of the sensor circuit will be described. First, a potential for turning on the transistor 613 is supplied as the signal G2, and a potential with respect to the voltage VRES is thus applied to the node n connected to the gate of the transistor 611. Then, a potential for turning off the transistor 613 is applied as the signal G2, whereby the potential of the node n is maintained.

Then, mutual capacitance of the capacitor 603 changes owing to the approach or contact of an object such as a finger, and accordingly the potential of the node n is changed from VRES.

In reading operation, a potential for turning on the transistor 612 is supplied as the signal G1. A current flowing through the transistor 611, that is, a current flowing through the wiring ML is changed in accordance with the potential of the node n. By sensing this current, the approach or contact of an object can be sensed.

It is preferred that the transistors 611, 612, and 613 each include an oxide semiconductor in a semiconductor layer where a channel is formed. In particular, by using an oxide semiconductor in a semiconductor layer where a channel of the transistor 613 is formed, the potential of the node n can be held for a long time and the frequency of operation (refresh operation) of resupplying the voltage VRES to the node n can be reduced.

At least part of this embodiment can be implemented in combination with any of the embodiments described in this specification as appropriate.

Embodiment 5

In this embodiment, a structural example of a display panel of one mode of a display panel which can be applied to a display device of one embodiment of the present invention and is easily increased in size is described with reference to drawings.

One embodiment of the present invention is a display panel capable of increasing its size by arranging a plurality of display panels to partly overlap one another. In two of the overlapping display panels, at least a display panel positioned on the display surface side (upper side) includes a region transmitting visible light that is adjacent to a display portion. A pixel of a display panel positioned on the lower side and the region transmitting visible light of the display panel positioned on the upper side are provided to overlap with each other. Thus, the two of the overlapping display panels can display a seamless and contiguous image when seen from the display surface side (in a planar view).

For example, one embodiment of the present invention is a display panel including a first display panel and a second display panel. The first display panel includes a first region including a first pixel and a second pixel. The second display panel includes a second region, a third region, and a fourth region. The second region includes a third pixel. The third region has a function of transmitting visible light. The fourth region has a function of blocking visible light. The second pixel of the first display panel and the third region of the second display panel overlap with each other in a region. An aperture ratio of the second pixel is higher than an aperture ratio of the first pixel.

Specifically, the following structure can be employed for example.

Figure 18A:
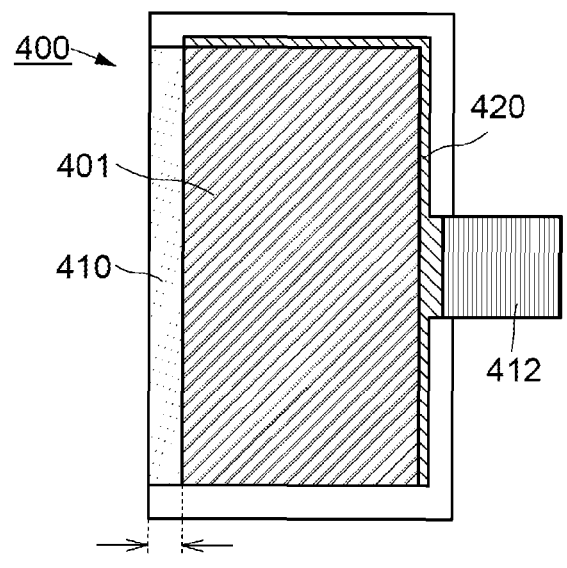
FIGS. 18A and 18B are diagrams for explaining a display panel of one embodiment.

FIG. 18A is a schematic top view of a display panel 400 included in a display device of one embodiment of the present invention.

The display panel 400 includes a display region 401, and a region 410 transmitting visible light and a region 420 having a portion blocking visible light that are adjacent to the display region 401. Furthermore, the display panel 400 is provided with a flexible printed circuit (FPC) 412 in the example illustrated in FIG. 18A.

Here, an image can be displayed on the display region 401 even when the display panel 400 is used independently.

In the region 410, for example, a pair of substrates included in the display panel 400, a sealant for sealing the display element sandwiched between the pair of substrates, and the like may be provided. Here, for members provided in the region 410, materials that transmit visible light are used.

In the region 420, for example, a wiring electrically connected to the pixels included in the display region 401 is provided. In addition to the wiring, driver circuits (such as a scan line driver circuit and a signal line driver circuit) for driving the pixels and a circuit such as a protective circuit may be provided. Furthermore, the region 420 includes a region where a terminal electrically connected to the FPC 412 (also referred to as a connection terminal), a wiring electrically connected to the terminal, and the like are provided.

For specific description of a cross-sectional structure example or the like of the display panel, Embodiments 2, 3, and 4 can be referred to.

[Display Panel 1]

Figure 18B:
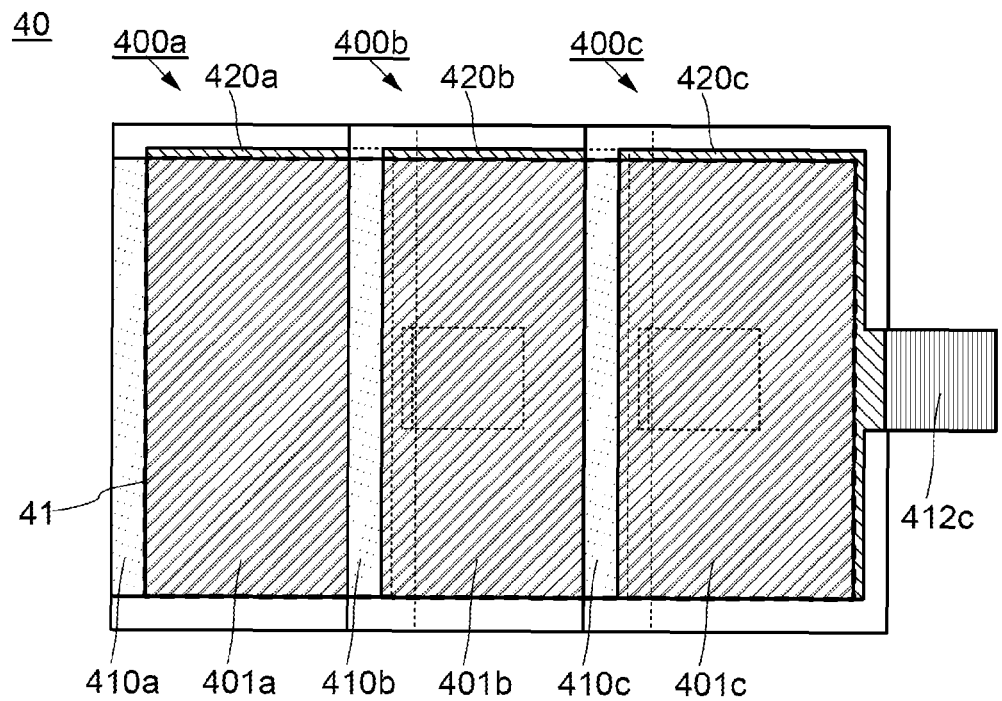

A display panel 40 of one embodiment of the present invention includes a plurality of display panels 400 described above. FIG. 18B is a schematic top view of the display panel 40 including three display panels.

Hereinafter, to distinguish the display panels from each other, the same components included in the display panels from each other, or the same components relating to the display panels from each other, letters are added to reference numerals of them. Unless otherwise specified, in a plurality of display panels partly overlapping with each other, "a" is added to reference numerals for a display panel placed on the lowest side (the side opposite to the display surface side), components thereof, and the like, and to one or more display panels placed on the upper side of the display panel, components thereof, and the like, "b" or letters after "b" in alphabetical order are added from the lower side. Furthermore, unless otherwise specified, in describing a structure in which a plurality of display panels is included, letters are not added when a common part of the display panels, the components, or the like is described.

The display panel 40 in FIG. 18B includes a display panel 400*a*, a display panel 400*b*, and a display panel 400*c*.

Furthermore, the display panel 400*b* is placed so that part of the display panel 100*b* overlaps an upper side (a display surface side) of the display panel 400*a*. Specifically, the display panel 400*b* is placed so that a region 410*b* transmitting visible light of the display panel 400*b* overlaps part of a display region 401*a* of the display panel 400*a*, and the display region 401*a* of the display panel 400*a* and a region 420*b* blocking visible light of the display panel 400*b* do not overlap each other.

Furthermore, the display panel 400*c* is placed so that part of the display panel 400*c* overlaps an upper side (a display surface side) of the display panel 400*b*. Specifically, the display panel 400*c* is placed so that a region 410*c* transmitting visible light of the display panel 400*c* overlaps part of a display region 401*b* of the display panel 400*b*, and the display region 401*b* of the display panel 400*b* and a region 420*c* blocking visible light of the display panel 400*c* do not overlap each other.

The region 410*b* transmitting visible light overlaps the display region 401*a*; thus, the whole display region 401*a* can be visually recognized from the display surface side. Similarly, the whole display region 401*b* can also be visually recognized from the display surface side when the region 410*c* overlaps the display region 401*b*. Therefore, a region where the display region 401*a*, the display region 401*b*, and the display region 401*c* are placed seamlessly can serve as a display region 41 of the display panel 40.

[Display Panel 2]

In FIG. 18B, the plurality of display panels 400 overlap each other in one direction; however, a plurality of display panels 400 may overlap each other in two directions of the vertical and horizontal directions.

Figure 19A:
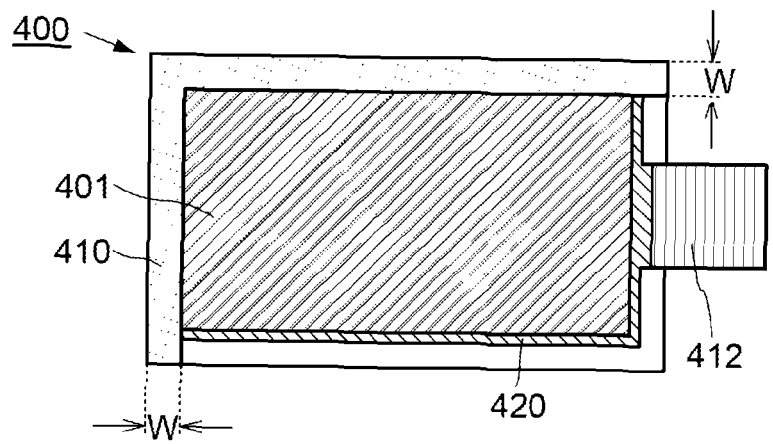
FIGS. 19A to 19C are diagrams for explaining a display panel of one embodiment.

FIG. 19A illustrates an example of the display panel 400 in which the shape of the region 410 is different from that in FIG. 18A. In the display panel 400 in FIG. 19A, the region 410 is placed along adjacent two sides of the display region 401.

Figure 19B:
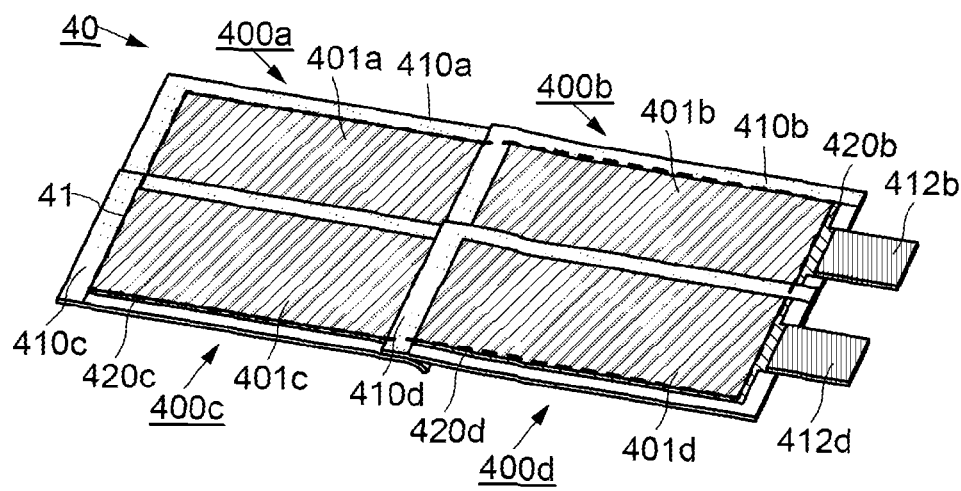
Figure 19C:
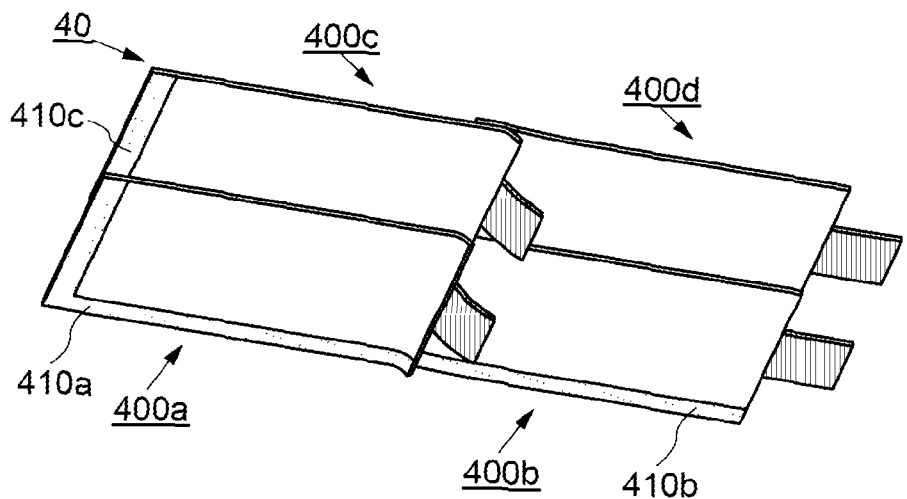

FIG. 19B is a schematic perspective view of the display panel 40 in which the display panels 400 in FIG. 19A are arranged two by two in both vertical and horizontal directions. FIG. 19C is a schematic perspective view of the display panel 40 when seen from a side opposite to the display surface side.

In FIGS. 19B and 19C, part of the region 410b of the display panel 400b overlaps a region along a short side of the display region 401a of the display panel 400a. In addition, part of the region 410c of the display panel 400c overlaps a region along a long side of the display region 401a of the display panel 400a. Moreover, the region 410d of the display panel 400d overlaps both a region along a long side of the display region 401b of the display panel 400b and a region along a short side of the display region 401c of the display panel 400c.

Therefore, as illustrated in FIG. 19B, a region where the display region 401a, the display region 401b, the display region 401c, and the display region 401d are placed seamlessly can serve as the display region 41 of the display panel 40.

Here, it is preferable that a flexible material be used for the pair of substrates included in the display panel 400 and the display panel 400 have flexibility. Thus, as is the case of the display panel 400a in FIGS. 19B and 19C, part of the display panel 400a on the FPC 412a side is curved when the FPC 412a and the like are provided on the display surface side, whereby the FPC 412a can be placed under the display region 401b of the adjacent display panel 400b so as to overlap with the display region 401b, for example. As a result, the FPC 412a can be placed without physical interference with the rear surface of the display panel 400b. Furthermore, when the display panel 400a and the display panel 400b overlap and are bonded to each other, it is not necessary to consider the thickness of the FPC 412a; thus, the difference in height between the top surface of the region 410b of the display panel 400b and the top surface of the display region 401a of the display panel 400a can be reduced. As a result, the end portion over the display region 401a of the display panel 400b can be prevented from being visually recognized.

Moreover, each display panel 400 has flexibility, whereby the display panel 400b can be curved gently so that the top surface of the display region 401b of the display panel 400b and the top surface of the display region 401a of the display panel 400a are equal to each other in height. Thus, the heights of the display regions can be equal to each other except in the vicinity of the region where the display panel 400a and the display panel 400b overlap each other, so that the display quality of an image displayed on the display region 41 of the display panel 40 can be improved.

Although, the relation between the display panel 400a and the display panel 400b is taken as an example in the above description, the same can apply to the relation between any two adjacent display panels.

Furthermore, to reduce the step between two adjacent display panels 400, the thickness of the display panel 400 is preferably small. For example, the thickness of the display panel 400 is preferably less than or equal to 1 mm, further preferably less than or equal to 300 µm, still further preferably less than or equal to 100 µm.

Note that although the four display panels 400 are placed to partly overlap one another here, the number of the display panels 400 is increased, whereby a large display panel can be obtained. Furthermore, by changing a method for arranging the plurality of display panels 400, the shape of the contour of the display region of the display panel can be any of a variety of shapes such as a circular shape, an elliptical shape, and a polygonal shape. In addition, when the display panels 400 are arranged in a three-dimensional manner, a display panel including a display region with a three-dimensional shape can be obtained.

At least part of this embodiment can be implemented in combination with any of the embodiments described in this specification as appropriate.

This application is based on Japanese Patent Application serial No. 2014-155999 filed with Japan Patent Office on Jul. 31, 2014, the entire contents of which are hereby incorporated by reference.

What is claimed is:

1. A display device comprising:
    a display panel;
    a fixing portion;
    a plurality of supporting members;
    a cord; and
    a roll-up mechanism,
    wherein the display panel is flexible,
    wherein the fixing portion is configured to support part of the display panel,
    wherein the plurality of supporting members each have a belt-like shape and are arranged on a rear surface of the display panel at intervals,
    wherein each of the plurality of supporting members is placed in a direction substantially parallel to the fixing portion,
    wherein the cord is connected to one of the plurality of supporting members that is the farthest from the fixing portion,
    wherein the roll-up mechanism is configured to roll up the cord,
    wherein the display panel has a first state where a display surface is flat and a second state where the display surface is folded, and
    wherein the display device is configured to change a distance between the fixing portion and the supporting member that is the farthest from the fixing portion with the roll-up mechanism so that a state of the display panel is changed to the first state, the second state, or a state between the first state and the second state.

2. The display device according to claim 1,
    wherein the smallest curvature radius of a curved portion of the display panel in the second state is greater than or equal to 1 mm and less than or equal to 50 mm.

3. The display device according to claim 1,
    wherein a cushioning material is provided between the supporting member and the display panel, and
    wherein the cushioning material has elasticity and a width of the cushioning material is larger than that of the supporting member in a short-side direction.

4. The display device according to claim 1,
    wherein a thickness of the supporting member is greater than or equal to 1 mm and less than or equal to 30 mm.

5. The display device according to claim 1,
    wherein a distance between the two adjacent supporting members in the first state is larger than each of the widths of the two adjacent supporting members in the short-side direction.

6. The display device according to claim 1,
    wherein an angle formed by the short-side direction of the supporting member and a displacement direction of the supporting member in the second state is greater than or equal to 10° and less than 90°.

7. The display device according to claim 1, further comprising:
an adjusting mechanism which adjusts the angle formed by the short-side direction of the supporting member and the displacement direction of the supporting member.

8. The display device according to claim 1,
wherein the fixing portion comprises a circuit electrically connected to the display panel.

9. The display device according to claim 1,
wherein the fixing portion comprises at least one of an antenna, a wireless receiver, a wireless transmitter, a battery, an arithmetic device, and a memory device.

* * * * *